United States Patent
Umebayashi

(10) Patent No.: US 8,420,714 B2
(45) Date of Patent: Apr. 16, 2013

(54) INK COMPOSITION, AND INKJET RECORDING METHOD

(75) Inventor: Tsutomu Umebayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 501 days.

(21) Appl. No.: 12/693,144

(22) Filed: Jan. 25, 2010

(65) Prior Publication Data

US 2010/0203262 A1    Aug. 12, 2010

(30) Foreign Application Priority Data

Feb. 9, 2009    (JP) .................................. 2009-027361

(51) Int. Cl.
*C09D 11/00*    (2006.01)
(52) U.S. Cl.
USPC ............ 523/160; 523/161; 427/595; 524/104
(58) Field of Classification Search .................. 523/160, 523/161
See application file for complete search history.

(56) References Cited

U.S. PATENT DOCUMENTS

| | | | |
|---|---|---|---|
| 6,280,890 B1* | 8/2001 | Sawamura et al. | 430/7 |
| 2004/0141040 A1* | 7/2004 | Nakajima | 347/102 |
| 2005/0277708 A1 | 12/2005 | Vanmaele et al. | |
| 2007/0204762 A1* | 9/2007 | Bach et al. | 106/496 |
| 2008/0076846 A1* | 3/2008 | Kito et al. | 522/26 |

FOREIGN PATENT DOCUMENTS

| | | |
|---|---|---|
| JP | 2000-504778 A | 4/2000 |
| JP | 2004-002528 A | 1/2004 |
| JP | 2005-105225 A | 4/2005 |
| JP | 2010-59224 A | 3/2010 |
| WO | 97/31071 A1 | 8/1997 |

OTHER PUBLICATIONS

European Search Report dated Jun. 15, 2010.
Japanese Office Action dated Feb. 5, 2013 in corresponding Japanese Application No. 2009-027361.

* cited by examiner

*Primary Examiner* — Doris Lee
(74) *Attorney, Agent, or Firm* — Sughrue Mion, PLLC

(57) ABSTRACT

An ink composition comprising: (A) an isoindoline-based pigment; (B) a polymeric dispersant; (C) an alkylammonium salt of a sulfonated derivative of a disazo-based yellow colorant; (D) a polymerizable compound; and (E) a polymerization initiator.

13 Claims, 2 Drawing Sheets

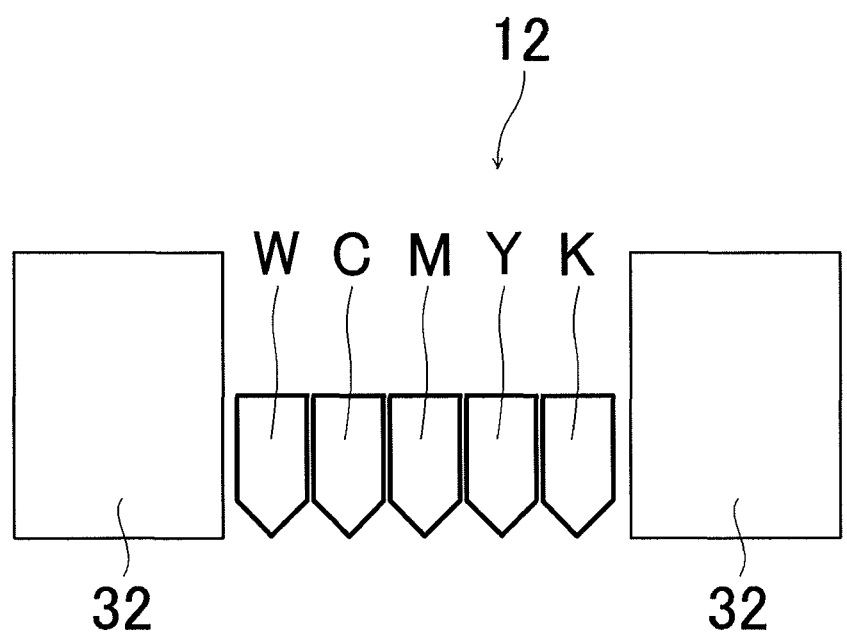

INK COMPOSITION, AND INKJET RECORDING METHOD

BACKGROUND OF THE INVENTION

1. Field of the Invention

The present invention relates to an ink composition and inkjet recording method.

2. Description of the Related Art

Inkjet systems, in which ink is discharged as droplets from an ink discharge orifice, are employed in many printers for reasons such as small size, low cost, and an ability to form an image without contacting a recording medium. Among these inkjet systems, a piezo inkjet system, in which ink is discharged by utilizing deformation of a piezoelectric element, and a thermal inkjet system, in which droplets of ink are discharged by utilizing the phenomenon of boiling of the ink by means of thermal energy, are characterized by their high resolution and high speed printing properties.

In recent years, inkjet printers have not been limited only to photographic printing and document printing for home use or office use, and the development of commercial printing equipment and industrial printing equipment employing inkjet printers has been carried out.

In contrast to conventional inkjet ink compositions and inkjet recording methods for home use or office use, there is a strong requirement for inkjet ink compositions and recording methods intended for use in commercial printing equipment or industrial printing equipment to have wide color reproduction in a formed image, and an excellent prolonged discharge reliability.

Furthermore, JP-PCT-2000-504778 (JP-PCT denotes a published Japanese translation of a PCT application) discloses a radiation-curable inkjet composition comprising 80% to 95% by weight of polyfunctional alkoxylated and/or polyfunctional polyalkoxylated acrylate monomer, and a photo polymerization initiator.

Furthermore, JP-A-2004-2528 discloses a UV-curable ink composition for inkjet recording consisting at least of a yellow pigment, a photopolymerizable compound, and a photopolymerization initiator, wherein the ink composition comprises C.I. pigment yellow 180 as the yellow pigment and a polymeric dispersant having a basic absorbing group, and JP-A-2005-105225 discloses an actinic radiation-curing inkjet ink composition comprising a photo-acid generator, a photopolymerizable compound and a pigment, wherein the photo-acid generator is an onium salt which does not produce benzene by irradiation with actinic radiation, the photopolymerizable compound is a compound having the oxetane ring, and the pigment is at least one selected from the group consisting of C.I. (Color Index) PY74, PY93, PY120, PY128, PY138, PY139, PY151, PY166, PY180, PY185, PR122, PR177, PV19, PB15:3, PB15:4, and PBk7.

BRIEF SUMMARY OF THE INVENTION

Inkjet ink compositions and inkjet recording methods for home use or office use have often been developed for the purpose of printing photographs or documents, and there is the serious problem that their color reproduction range as commercial or industrial printed materials is narrow.

Furthermore, when recording is carried out on a non-absorbing recording medium by the use of conventional inkjet ink compositions and inkjet recording methods, there are the practical problems that if it takes a long time for drying of the fired droplets or penetration thereof into the recording medium, the image easily spreads, and there is mixing of adjacent ink composition droplets on the recording medium, thereby preventing a sharp image from being formed.

Furthermore, in a method described in published Japanese translation 2000-504778 of a PCT application, when the amount of ink composition droplets applied is increased, etc. in order to obtain a wide color reproduction range, there is a concern that an image will be disturbed due to cracking of a cured film. Moreover, when an ink composition is prepared by increasing the pigment concentration in order to obtain a wide color reproduction range, the ink composition might have high viscosity, and there might be a problem with the long-term discharge stability due to an increase in the concentration of coarse particles in the ink composition.

Furthermore, in the methods described in JP-A-2004-2528 (JP-A denotes a Japanese unexamined patent application publication) and JP-A-2005-105225, there are cases in which the pigment particle size in the ink composition prepared is large, and there might be a problem with the long-term discharge stability.

It is an object of the present invention to provide an ink composition and an inkjet recording method for which inkjet dischargeability, long-term stability, and curability are excellent, and for which an image formed has excellent saturation.

The above-mentioned object of the present invention has been attained by means described from <1> to <15> below.

<1> An ink composition comprising: (A) an isoindoline-based pigment; (B) a polymeric dispersant; (C) an alkylammonium salt of a sulfonated derivative of a disazo-based yellow colorant; (D) a polymerizable compound; and (E) a polymerization initiator, <2> The ink composition according to <1>, wherein the isoindoline-based pigment (A) is C.I. Pigment Yellow 185, <3> The ink composition according to <1> or <2>, wherein the alkylammonium salt of the sulfonated derivative of the disazo-based yellow colorant (C) is a sulfonated derivative of a disazo-based yellow colorant selected from the group consisting of C.I. Pigment Yellow 12, C.I. Pigment Yellow 14, C.I. Pigment Yellow 17, C.I. Pigment Yellow 81, and C.I. Pigment Yellow 83, <4> The ink composition according to any one of <1> to <3>, wherein the alkylammonium salt of the sulfonated derivative of the disazo-based yellow colorant (C) is a compound having a sulfonate group on an aromatic ring, <5> The ink composition according to any one of <1> to <4>, wherein the alkylammonium salt of the sulfonated derivative of the disazo-based yellow colorant (C) comprises a monoalkylammonium salt of a monosulfonated derivative of a disazo-based yellow colorant, <6> The ink composition according to any one of <1> to <5>, wherein the alkylammonium salt of the sulfonated derivative of the disazo-based yellow colorant (C) is a compound represented by Formula (1) below,

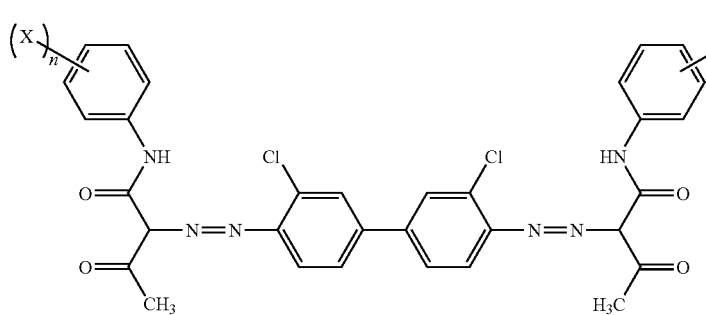
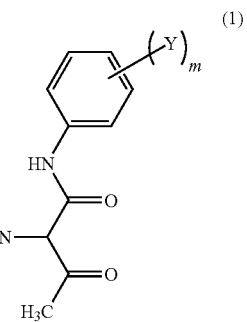

(in Formula (1), X and Y independently denote a group represented by Formula (2) below, and m and n each denote a number that satisfies $0.2 < m+n < 1.5$ and is 0 or more)

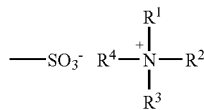

(in Formula (2), $R^1$ to $R^4$ independently denote a hydrogen atom or an alkyl group having 1 to 30 carbon atoms, and at least one of $R^1$ to $R^4$ is an alkyl group having 1 to 30 carbon atoms), <7> The ink composition according to any one of <1> to <6>, wherein the alkylammonium salt of the sulfonated derivative of the disazo-based yellow colorant (C) has a content of 3 to 100 wt % relative to the total weight of the isoindoline-based pigment (A) in the ink composition, <8> The ink composition according to any one of <1> to <7>, wherein the polymerizable compound (D) is a radically polymerizable compound, <9> The ink composition according to any one of <1> to <8>, wherein the polymerization initiator (E) comprises an acylphosphine oxide compound, <10> The ink composition according to any one of <1> to <9>, wherein the polymerization initiator (E) comprises an acylphosphine oxide compound and an α-aminobenzophenone compound, <11> The ink composition according to any one of <1> to <10>, wherein the polymerization initiator (E) comprises an α-hydroxybenzophenone compound and an α-aminobenzophenone compound, <12> An inkjet recording method comprising: (a¹) a step of discharging an ink composition onto a recording medium; and (b¹) a step of curing the ink composition by irradiating the discharged ink composition with actinic radiation; the ink composition being the ink composition according to any one of <1> to <11>, <13> The inkjet recording method according to <12>, wherein the recording medium is a non-absorbing recording medium, <14> A pigment dispersion comprising: (A) an isoindoline-based pigment; (B) a polymeric dispersant; and (C) an alkylammonium salt of a sulfonated derivative of a disazo-based yellow colorant, <15> The pigment dispersion according to <14>, wherein the alkylammonium salt of the sulfonated derivative of the disazo-based yellow colorant (C) has a content of 0.1 to 10 wt % relative to the total weight of the isoindoline-based pigment (A) in the pigment dispersion.

BRIEF DESCRIPTION OF DRAWING

FIG. 2 is an enlarged schematic diagram of an inkjet recording head unit part 12 of the inkjet recording system 10 shown in FIG. 1.

EXPLANATION OF REFERENCE NUMERALS AND SYMBOLS

Figure 1:
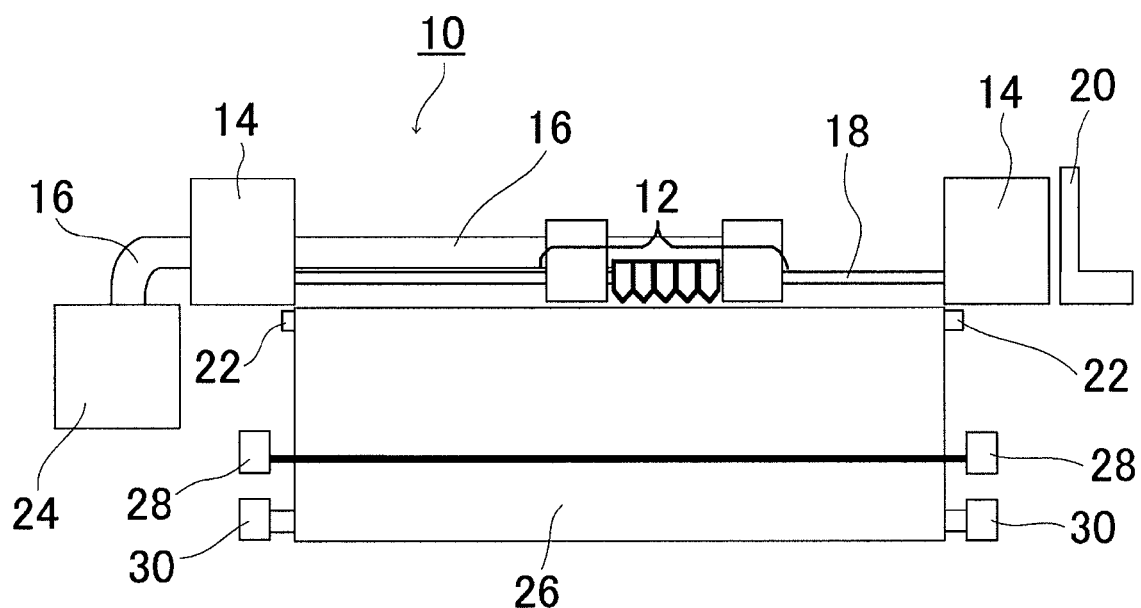
FIG. 1 is a schematic diagram illustrating one example of an inkjet recording system that can be used in the present invention.

10: inkjet recording system
12: inkjet recording head unit part
14: head maintenance/cleaning box
16: head reciprocation power part
18: head fixing shaft
20: controlling personal computer
22: recording medium suction stage
24: ink tank
26: recording medium
28: recording medium transport roller
30: recording medium wind-up roller
32: UV irradiation metal halide lamps
W: inkjet head for white ink composition
C: inkjet head for cyan ink composition
M: inkjet head for magenta ink composition
Y: ink jet head for ink composition of the present invention
K: inkjet head for black ink composition

DETAILED DESCRIPTION OF THE INVENTION

The present invention is described in detail below. In the present invention, unless otherwise specified, description 'A to B', which indicates a numerical value range, means 'not less than A, not more B', and therefore, the range includes each value of both endpoints.

(1) Ink Composition, Pigment Dispersion for Ink Composition

An ink composition (hereinafter, also simply called an 'ink') of the present invention comprises (A) a isoindoline-based pigment, (B) a polymeric dispersant, (C) an alkylammmonium salt of a sulfonated derivative of a disazo-based yellow colorant, (D) a polymerizable compound, and (E) a polymerization initiator.

The ink composition of the present invention is preferably a yellow-color ink composition (also called a 'yellow ink composition').

Furthermore, the ink composition of the present invention may be used suitably as an inkjet recording ink composition.

The ink composition of the present invention is an ink composition that can be cured by radiation, and is an oil-based ink composition.

The 'radiation' referred to in the present invention is not particularly limited as long as it is actinic radiation that can provide energy allowing an initiator species to be generated in an ink composition by the radiation, and broadly includes α rays, γ rays, X rays, ultraviolet rays (UV rays), visible rays and electron beams and, among these, ultraviolet rays and electron beams are preferable from the viewpoint of curing sensitivity and the availability of equipment, and ultraviolet rays are particularly preferable. The ink composition of the present invention is therefore preferably an ink composition that can cure upon exposure to ultraviolet rays as radiation.

(A) Isoindoline-Based Pigment

The ink composition of the present invention comprises (A) an isoindoline-based pigment.

The isoindoline-based pigment that can be used in the present invention is not particularly limited as long as it is a pigment having an isoindoline structure, but is preferably an isoindoline-based yellow pigment.

Examples of the isoindoline-based yellow pigment include C.I. Pigment Yellow 139 and C.I. Pigment Yellow 185.

Among them, it is preferable to use C.I. Pigment Yellow 185, for which the effects of the present invention are markedly exhibited.

For dispersion of the isoindoline-based pigment, for example, dispersing equipment such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, a wet type jet mill, or a bead mill may suitably be used. Among them, it is preferable to use a media dispersing machine using balls and beads, etc. and more preferable to use a bead mill dispersing machine.

A dispersion medium used when dispersing the above-mentioned isoindoline-based pigment in the ink composition is not particularly limited, and it may be selected appropriately according to the intended application; for example, a low molecular weight actinic radiation-curable compound may be used as the dispersion medium, or a solvent may be used as the dispersion medium. However, the ink composition of the present invention is a radiation-curing ink composition, and since the ink composition is cured after being applied onto a recording medium, it is preferable that it does not contain a solvent and is solvent-free. This is because, if solvent remains in a cured ink image, the solvent resistance is degraded, and the VOC (Volatile Organic Compound) problem of residual solvent occurs. Because of this, from the viewpoint of dispersion suitability and improvement of ease of handling of the ink composition it is preferable that an actinic radiation-curable compound is used as the dispersion medium, and a polymerizable compound having the lowest viscosity is selected therefrom.

The average particle size of the isoindoline-based pigment is not particularly limited and may be selected appropriately according to the intended application, but since the finer it is the better coloring properties, it is preferably 0.01 to 0.4 µm, and more preferably 0.02 to 0.2 µm. The maximum particle size of the isoindoline-based pigment is preferably no greater than 3 µm, and more preferably no greater than 1 µm. The particle size of the isoindoline-based pigment may be adjusted by selection of the isoindoline-based pigment, dispersing agent, and dispersion medium and setting of dispersion conditions and filtration conditions; head nozzle clogging can be suppressed by controlling the particle size of the organic pigment, and it is thus possible to maintain the storage stability of an ink composition, and the transparency and curing sensitivity of an ink composition.

In the present invention, since an alkylammonium salt of a sulfonated derivative of a disazo based yellow colorant (C), which has excellent dispersibility and stability, is contained, a uniform and stable ink composition can be prepared. Particularly even when the isoindoline-based pigment having a particle size of 0.4 µm or less is used, a uniform and stable ink composition can be prepared. Furthermore, even if the isoindoline-based pigment, which cannot be sufficiently dispersed by a conventional dispersant, is used, good dispersibility can be achieved, and an ink composition having excellent color reproduction can be obtained.

The particle size of the isoindoline-based pigment in the ink composition may be measured by a known measurement method. Specifically, it may be measured by a centrifugal sedimentation light transmission method, an X-ray transmission method, a laser diffraction/scattering method, or a dynamic light scattering method.

From the viewpoint of sufficient saturation being obtained, the viscosity being in a range suitable for inkjet discharge, etc., the isoindoline-based pigment is preferably at least 1 wt % but no greater than 20 wt % relative to the total weight of the ink composition, more preferably at least 2 wt % but no greater than 15 wt %, and particularly preferably at least 3 wt % but no greater than 10 wt %.

(B) Polymeric Dispersant

The ink composition of the present invention comprises a polymeric dispersant (B).

The 'polymeric dispersant' referred to in the present invention means a dispersant having a weight-average molecular weight of 1,000 or greater.

The weight-average molecular weight Mw of the polymeric dispersant is preferably in the range of 2,000 to 300,000, more preferably 3,000 to 200,000, yet more preferably 4,000 to 100,000, and particularly preferably 5,000 to 100,000. When the weight-average molecular weight of the polymeric dispersant is in the above-mentioned range, the dispersibility of the pigment improves, and the storage stability and dischargeability of the ink composition are good.

The main chain skeleton of the polymeric dispersant is not particularly limited; examples thereof include a polyurethane skeleton, a polyacrylic skeleton, a polyester skeleton, a polyimide skeleton, a polyimide skeleton, and a polyurea skeleton, and from the viewpoint of storage stability of the ink composition a polyurethane skeleton, a polyacrylic skeleton, and a polyester skeleton are preferable. The structure of the polymeric dispersant is not particularly limited either; examples thereof include a random structure, a block structure, a comb structure, and a star structure, and similarly from the viewpoint of storage stability a block structure or a comb structure is preferable.

Examples of the polymeric dispersant include commercial wetting dispersants DISPER BYK series 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150 sold by BYK-Chemie GmbH; EFKA series 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 sold by Ciba Specialty Chemicals Inc.; Solsperse series 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 sold by Lubrizol Corp.; DISPARLON series 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 sold by Kusumoto Chemicals Ltd., AJISPER PB series PB-711, PB-821, PB-822, PN-411, and PA-111 sold by Ajinomoto Fine-Techno Co.; Surfynol series 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE sold by Air Products and Chemicals. Inc.; Olfine series STG, and E1004 sold by Nissin Chemical Industry Co., Ltd.; SN Sperse series 70, 2120, and 2190 sold by San Nopco Ltd.; ADEKA COL and ADEKA TOL series sold by Adeka Corp.; SAN-NONIC series, NAROACTY CL series, EMULMIN series, NEWPOL PE series, IONET M series, IONET D series, IONET S series, IONET T series, and SANSEPARER 100 sold by Sanyo Chemical Industries, Ltd.

With regard to the polymeric dispersant, the concentration thereof added to a pigment dispersion is not particularly limited, and it is preferably determined while taking into consideration the chemical structure of a dispersant used and the pigment concentration.

From the viewpoint of the dispersibility of the pigment and the concentration of free dispersant being decreased, the content of the polymeric dispersant in the ink composition of the present invention is preferably at least 1 wt % but no greater than 50 wt % relative to the total weight of the isoindoline-based pigment in the ink composition, more preferably at least 2 wt % but no greater than 30 wt %, and particularly preferably at least 5 wt % but no greater than 20 wt %.

aromatic ring. That is, the alkylammonium salt of the sulfonated derivative of the disazo-based yellow colorant is preferably a compound having a sulfonate group on an aromatic ring.

The four groups on the nitrogen atom of the ammonium group in the alkylammonium salt of the sulfonated derivative of the disazo-based yellow colorant are independently preferably hydrogen atoms or alkyl groups having 1 to 30 carbon atoms, and more preferably alkyl groups having 1 to 30 carbon atoms. In addition, at least one of the four groups on the nitrogen atom is an alkyl group, and at least one of the four groups on the nitrogen atom is preferably an alkyl group having 1 to 30 carbon atoms.

Furthermore, two or more groups of the four groups on the nitrogen atom may be bonded to form a ring structure.

Moreover, when the alkylammonium salt of the sulfonated derivative of the disazo-based yellow colorant has two or more ammonium groups, they may be identical to or different from each other.

The ammonium group in the alkylammonium salt of the sulfonated derivative of the disazo-based yellow colorant is preferably a tetraalkylammonium group, and more preferably a tetraalkylammonium group having two alkyl groups having 10 to 30 carbon atoms and two alkyl groups having 1 to 3 carbon atoms.

The alkylammonium salt of the sulfonated derivative of the disazo-based yellow colorant is preferably the alkylammonium salt of the sulfonated derivative of C.I. Pigment Yellow 12, and more preferably the compound represented by Formula (1) below.

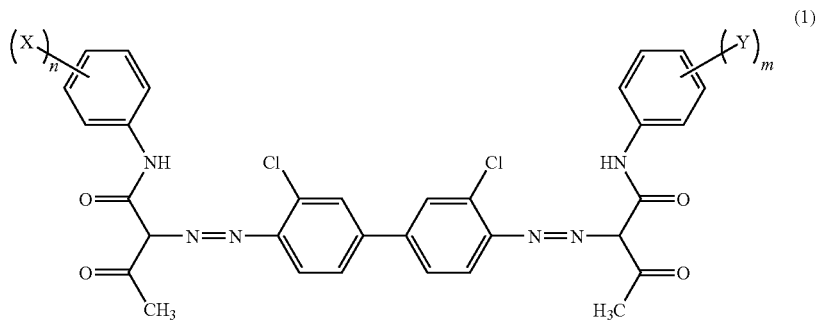

(C) Alkylammonium Salt of a Sulfonated Derivative of a Disazo-Based Yellow Colorant The ink composition of the present invention comprises (C) an alkylammonium salt of a sulfonated derivative of a disazo-based yellow colorant (hereinafter, also called 'specific dispersion adjuvant').

One type of the alkylammonium salt of the sulfonated derivative of the disazo-based yellow colorant may be used on its own, or two or more types thereof may be used in combination.

Examples of the alkylammonium salt of the sulfonated derivative of the disazo-based yellow colorant include C.I. Pigment Yellow 12, C.I. Pigment Yellow 14, C.I. Pigment Yellow 17, C.I. Pigment Yellow 81, and C.I. Pigment Yellow 83.

The position of substitution of a sulfonate group ($-SO_3^-$) in the alkylammonium salt of the sulfonated derivative of the disazo-based yellow colorant is not particularly limited; it may be substituted at any position, and preferably on an (in Formula (1), X and Y independently denote a group represented by Formula (2) below, and m and n each denote a number that satisfied $0.2 < m+n < 1.5$ and is 0 or more).

(in Formula (2), $R^1$ to $R^4$ independently denote a hydrogen atom or an alkyl group having 1 to 30 carbon atoms, and at least one of $R^1$ to $R^4$ is an alkyl group having 1 to 30 carbon atoms).

m and n in Formula (1) each denote a number that satisfies $0.2 < m+n < 1.5$ and is 0 or more. It is also preferable for m and n to be positive numbers.

X and Y in Formula (1) independently denote a group represented by Formula (2) above.

$R^1$ to $R^4$ in Formula (2) independently denote a hydrogen atom or an alkyl group having 1 to 30 carbon atoms, and at least one of $R^1$ to $R^4$ is an alkyl group having 1 to 30 carbon atoms.

In Formula (2), $R^1$ to $R^4$ are independently preferably alkyl groups having 1 to 30 carbon atoms, and it is more preferable for $R^1$ and $R^2$ to be independently alkyl groups having 10 to 30 carbon atoms and for $R^3$ and $R^4$ to be independently alkyl groups having 1 to 3 carbon atoms.

Furthermore, the sum m+n of m and n satisfies $0.2<m+n<1.5$, preferably $0.5<m+n<1.4$, and more preferably $0.7<m+n<1.2$. When it is stated that m+n=0.5, is a mixture of the disazo-based yellow colorant and a sulfonated derivative of the disazo-based yellow colorant (including a monosulfonated derivative, a disulfonated derivative, etc.), and as an average the amount of ammoniated sulfo group of the disazo-based yellow colorant is 0.5 on average.

The ink composition of the present invention preferably comprises (c-1) a monoalkylammonium salt of a monosulfonated derivative of a disazo-based yellow colorant, (c-2) a monoalkylammonium salt of a monosulfonated derivative of a disazo-based yellow colorant and a dialkylammonium salt of a disulfonated derivative of a disazo-based yellow colorant, (c-3) a disazo-based yellow colorant and a monoalkylammonium salt of a monosulfonated derivative of a disazo-based yellow colorant, (c-4) a disazo-based yellow colorant, a monoalkylammonium salt of a monosulfonated derivative of a disazo-based yellow colorant, and a dialkylammonium salt of a disulfonated derivative of a disazo-based yellow colorant, or (c-5) a disazo-based yellow colorant and a dialkylammonium salt of a disulfonated derivative of a disazo-based yellow colorant, and more preferably comprises (c-1) a monoalkylammonium salt of a monosulfonated derivative of a disazo-based yellow colorant, (c-2) a monoalkylammonium salt of a monosulfonated derivative of a disazo-based yellow colorant and a dialkylammonium salt of a disulfonated derivative of a disazo-based yellow colorant, (c-3) a disazo-based yellow colorant and a monoalkylammonium salt of a monosulfonated derivative of a disazo-based yellow colorant, or (c-4) a disazo-based yellow colorant, a monoalkylammonium salt of a monosulfonated derivative of a disazo-based yellow colorant, and a dialkylammonium salt of a disulfonated derivative of a disazo-based yellow colorant.

Furthermore, the disazo-based yellow colorant, the monoalkylammonium salt of the monosulfonated derivative of the disazo-based yellow colorant, and the dialkylammonium salt of the disulfonated derivative of the disazo-based yellow colorant that can be contained in the ink composition are preferably disazo-based yellow colorants of the same type and alkylammonium salts of sulfonated derivatives thereof.

Moreover, the amount of $-SO_3^-$ of the alkylammonium salt of the sulfonated derivative of the disazo-based yellow colorant is preferably 0.2 to 2.0 on average per molecule relative to the total amount of the disazo-based yellow colorant and the alkylammonium salt of the sulfonated derivative of the disazo-based yellow colorant in the ink composition, more preferably greater than 0.2 but less than 1.5 on average, yet more preferably greater than 0.5 but less than 1.4 on average, and particularly preferably greater than 0.7 but less than 1.2 on average.

Specific examples of the alkylammonium salt of the sulfonated derivative of C.I. Pigment Yellow 12 include compounds shown below.

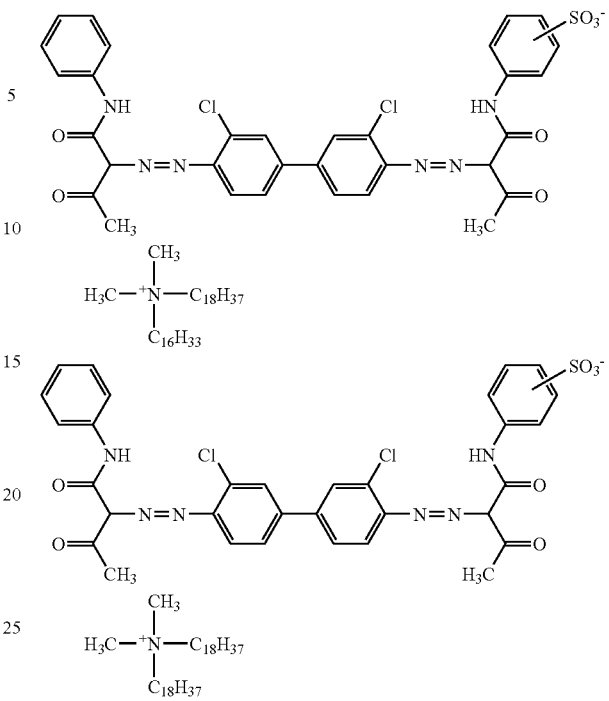

The content of the alkylammonium salt of the sulfonated derivative of the disazo-based yellow colorant in the ink composition of the present invention is preferably at least 0.1 wt % but no greater than 100 wt % relative to the total weight of the isoindoline-based pigment in the ink composition, more preferably at least 0.5 wt % but no greater than 80 wt %, and particularly preferably at least 2 wt % but no greater than 50 wt %.

(D) Polymerizable Compound

The ink composition of the present invention comprises a polymerizable compound (D).

The polymerizable compound that can be used in the present invention is, from the viewpoint of curability and fixation, preferably a radically polymerizable compound or a cationically polymerizable compound.

From the viewpoint of image fixation, the content of the polymerizable compound in the ink composition of the present invention, relative to the total weight of the ink composition, is preferably at least 40 wt % but no greater than 98 wt %, more preferably at least 50 wt % but no greater than 95 wt %, and particularly preferably at least 60 wt % but no greater than 90 wt %.

Radically Polymerizable Compound

The radically polymerizable compound in the present invention is not particularly limited as long as it is a compound that undergoes a radical polymerization reaction by the application of energy such as actinic radiation or heat and cures, and therefore any of a monomer, an oligomer, and a polymer may be used. Particularly there may be used various types of known radically polymerizable monomers known as photopolymerizable compounds in which a polymerization reaction is caused by an initiating species generated from a radical polymerization initiator, which will be described later. Moreover, the radically polymerizable compound may be a monofunctional compound or a polyfunctional compound.

As the radically polymerizable compound, an ethylenically unsaturated compound is preferable, and examples thereof include a (meth)acrylate, a (meth)acrylamide, and an aromatic vinyl compound. Here, the term '(meth)acrylate' is occasionally used to mean both or either of 'acrylate' and 'methacrylate', and the term '(meth)acryl' is occasionally used to mean both or either of 'acryl' and 'methacryl'.

One type of the radically polymerizable compound may be used on its own, or two or more types thereof may be used in combination.

As the radically polymerizable compound, from the viewpoint of curability and viscosity, a (meth)acrylate is preferable. Particularly from the viewpoint of viscosity, at least one type selected from monofunctional (meth)acrylates and bifunctional (meth)acrylates is more preferable.

The radically polymerizable compound used in the present invention is described in detail below.

As the (meth)acrylate used in the present invention, those below can be cited as examples.

Specific examples of monofunctional (meth)acrylates include hexyl(meth)acrylate, 2-ethylhexyl(meth)acrylate, t-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyldiglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, an alkoxymethyl(meth)acrylate, an alkoxyethyl(meth)acrylate, 2-(2-methoxyethoxy)ethyl(meth)acrylate, 2-(2-butoxyethoxy)ethyl(meth)acrylate, 2,2,2-trifluoroethyl(meth)acrylate, 1H,1H,2H,2H-perfluorodecyl(meth)acrylate, 4-butylphenyl(meth)acrylate, phenyl(meth)acrylate, 2,4,5-trimethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, a hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, dimethylaminoethyl(meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide(meth)acrylate, oligoethylene oxide(meth)acrylate, oligoethylene oxide monoalkyl ether(meth)acrylate, a polyethylene oxide monoalkyl ether(meth)acrylate, dipropylene glycol(meth)acrylate, polypropylene oxide monoalkyl ether(meth)acrylate, oligopropylene oxide monoalkyl ether(meth)acrylate, 2-(meth)acryloyloxyethylsuccinic acid, 2-(meth)acryloyloxyhexahydrophthalic acid, 2-(meth)acryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenol(meth)acrylate, and EO-modified 2-ethylhexyl(meth)acrylate.

Specific examples of bifunctional (meth)acrylates include 1,6-hexanediol di(meth)acrylate, 1,10-decanediol di(meth)acrylate, neopentyl glycol di(meth)acrylate, ethoxylated neopentyl glycol di(meth)acrylate, propoxylated neopentyl glycol di(meth)acrylate, dipropylene glycol di(meth)acrylate 2,4-dimethyl-1,5-pentanediol di(meth)acrylate, butylethylpropanediol(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, neopentyl glycol hydroxypivalate di(meth)acrylate, EO-modified bisphenol A di(meth)acrylate, bisphenol F polyethoxydi(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate.

Specific examples of trifunctional (meth)acrylates include trimethylolpropane tri(meth)acrylate, trimethylolethane tri(meth)acrylate, an alkylene oxide-modified tri(meth)acrylate of trimethylolpropane, pentaerythritol tri(meth)acrylate, dipentaerythritol tri(meth)acrylate, trimethylolpropane tris((meth)acryloyloxypropyl) ether, isocyanuric acid alkylene oxide-modified tri(meth)acrylate, propionic acid dipentaerythritol tri(meth)acrylate, tris((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerol tri(meth)acrylate.

Specific examples of tetrafunctional (meth)acrylates include pentaerythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

Specific examples of pentafunctional (meth)acrylates include sorbitol penta(meth)acrylate and dipentaerythritol penta(meth)acrylate.

Specific examples of hexafunctional (meth)acrylates include dipentaerythritol hexa(meth)acrylate, sorbitol hexa(meth)acrylate, an alkylene oxide-modified hexa(meth)acrylate of phosphazene, and caprolactone-modified dipentaerythritol hexa(meth)acrylate.

Examples of the (meth)acrylamide used in the present invention include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide, and (meth)acryloylmorpholine.

Specific examples of the aromatic vinyl compound include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxy styrene.

Further examples of the radically polymerizable monomer used in the present invention include vinyl esters (vinyl acetate, vinyl propionate, vinyl versatate, etc.), allyl esters (allyl acetate, etc.), halogen atom-containing monomers (vinylidene chloride, vinyl chloride, etc.), vinyl ether(methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, etc.), vinyl cyanides ((meth)acrylonitrile, etc.), and olefins (ethylene, propylene, etc.).

In the present invention, it is preferable to use a monofunctional (meth)acrylate and a polyfunctional (meth)acrylate in combination.

The monofunctional (meth)acrylate is preferably a monofunctional (meth)acrylate having an aromatic ring, and more preferably phenoxyethyl(meth)acrylate.

The polyfunctional (meth)acrylate is preferably a polyfunctional (meth)acrylate not having a cyclic structure. It is preferably a difunctional (meth)acrylate or a trifunctional (meth)acrylate, and more preferably neopentyl glycol di(meth)acrylate, an ethoxylated or propoxylated compound thereof, dipropylene glycol di(meth)acrylate, or trimethylol (meth)acrylate.

The content of the radically polymerizable compound is preferably 50 to 95 wt % relative to the total weight of the ink composition, more preferably 60 to 92 wt %, and yet more preferably 70 to 90 wt %.

The content of the monofunctional radically polymerizable compound is preferably 10 to 60 wt % relative to the total weight of the ink composition, more preferably 20 to 45 wt %, and yet more preferably 30 to 40 wt %.

Cationically Polymerizable Compound

The cationically polymerizable compound in the present invention is not particularly limited as long as it is a compound that undergoes a cationic polymerization reaction by the application of some type of energy and cures; any type of monomer, oligomer, or polymer may be used and, in particular, various types of known cationically polymerizable monomers, known as cationically photopolymerizable monomers, that undergo a polymerization reaction by an initiating species generated from a cationic polymerization initiator, which will be described later, may be used. Moreover, the cationically polymerizable compound may be a monofunctional compound or a polyfunctional compound.

As the cationically polymerizable compound in the present invention, from the viewpoint of curability and abrasion resistance, an oxetane-ring containing compound and an oxirane ring-containing compound are preferable, and a configuration in which both of an oxetane-ring containing compound and an oxirane ring-containing compound are contained is more preferable.

The oxirane ring-containing compound (hereinafter, also called an 'oxirane compound') is a compound containing at least one oxirane ring (oxiranyl group, epoxy group) per molecule; it may be appropriately selected from those normally used as epoxy resins, and specific examples thereof include conventionally known aromatic epoxy resins, alicyclic epoxy resins, and aliphatic epoxy resins. It may be any one of a monomer, an oligomer, and a polymer. Furthermore, the oxetane-ring containing compound (hereinafter, also called an 'oxetane compound') is a compound containing at least one oxetane ring (oxetanyl group) per molecule.

The cationically polymerizable compound used in the present invention is now explained in detail.

Examples of the cationically polymerizable compound include epoxy compounds, vinyl ether compounds, oxetane compounds described in JP-A-6-9714, JP-A-2001-31892, JP-A-2001-40068, JP-A-2001-55507, JP-A-2001-310938, JP-A-2001-310937, JP-A-2001-220526, etc.

Examples of monofunctional epoxy compounds used in the present invention include phenyl glycidyl ether, p-t-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Furthermore, examples of polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexenylmethyl-3',4'-epoxycyclohexenecarboxylate, 2-(3,4-epoxycyclohexyl)-7,8-epoxy-1,3-dioxaspiro[5.5]undecane, bis(3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexenyl-3', 4'-epoxy-6'-methylcyclohexenecarboxylate, methylenebis(3, 4-epoxycyclohexane), dicyclopentadiene diepoxide, di(3,4-epoxycyclohexylmethyl) ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5, 6-diepoxycyclooctane.

Among these epoxy compounds, the aromatic epoxides and the alicyclic epoxides are preferable from the viewpoint of excellent curing speed, and the alicyclic epoxides are particularly preferable.

Specific examples of monofunctional vinyl ethers used in the present invention include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Furthermore, examples of polyfunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether.

As the vinyl ether compound, the di- or tri-vinyl ether compounds are preferable from the viewpoint of curability, adhesion to a recording medium, surface hardness of the image formed, etc., and the divinyl ether compounds are particularly preferable.

The oxetane compound may be selected freely from known oxetane compounds such as those described in JP-A-2001-220526, JP-A-2001-310937, and JP-A-2003-341217.

The oxetane compound that can be used in the present invention is preferably a compound having 1 to 4 oxetane rings in its structure. Use of such a compound enables the viscosity of the inkjet recording liquid to be maintained in a range that gives ease of handling and enables high adhesion of the inkjet recording liquid to a recording medium after curing to be obtained.

Examples of monofunctional oxetane compounds used in the present invention include 3-ethyl-3-hydroxymethyloxetane, 3-allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyl diethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl)ether.

Examples of polyfunctional oxetane compounds include 3,7-bis(3-oxetanyl)-5-oxanonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenylbis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, ethylene oxide (EO)-modified bisphenol A bis(3-ethyl-3-oxetanylmethyl)ether, propylene oxide (PO)-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, and EO-modified bisphenol F (3-ethyl-3-oxetanylmethyl)ether.

Such oxetane compounds are described in detail in Paragraph Nos. 0021 to 0084 of JP-A-2003-341217, and compounds described therein can be used suitably in the present invention.

Among the oxetane compounds used in the present invention, from the viewpoint of viscosity and tackiness of the inkjet recording liquid, it is preferable to use a compound having 1 to 2 oxetane rings.

With regard to these cationically polymerizable compounds, one type may be used on its own, or two or more types may be used in combination.

The content of the cationically polymerizable compound, relative to the total ink composition, is preferably 50 to 95 wt %, more preferably 60 to 92 wt %, and yet more preferably 70 to 90 wt %.

(E) Polymerization Initiator

The ink composition in the present invention comprises a polymerization initiator (E) (hereinafter called simply an 'initiator').

The polymerization initiator that can be used in the present invention is, from the viewpoint of curability and fixation, preferably a radical polymerization initiator or a cationic polymerization initiator, and more preferably a photoradical polymerization initiator or a photocationic polymerization initiator.

Radical Polymerization Initiator, Cationic Polymerization Initiator

When comprising a radically polymerizable compound, the ink composition of the present invention preferably comprises a radical polymerization initiator, and when comprising a cationically polymerizable compound, it preferably comprises a cationic polymerization initiator.

The cationic polymerization initiator or the radical polymerization initiator is particularly preferably a photopolymerization initiator.

The cationic polymerization initiator or the radical polymerization initiator in the present invention is a compound that undergoes chemical change due to the action of light or interaction with an electronically excited state of a sensitizing dye and generates a radical, an acid, or a base, and it is particularly preferably the photo-radical generator or a photo-acid generator from the viewpoint of polymerization being initiated by the simple means of exposure.

In the present invention, a cationic polymerization initiator or a radical polymerization initiator may be used by appropriate selection from polymerization initiators described in detail below while taking into consideration the relationship with a cationically polymerizable compound or radically polymerizable compound that is used in combination.

As the photopolymerization initiator, one having sensitivity to actinic radiation applied such as, for example, ultraviolet rays at 400 to 200 nm, far ultraviolet rays, g-line, h-line, i-line, KrF excimer laser light, ArF excimer laser light, an electron beam, X rays, a molecular beam, or an ion beam, may be used by appropriate selection.

A photopolymerization initiator known to a person skilled in the art may be used without limitation, and many specific examples thereof are described in Bruce M. Monroe et al., Chemical Reviews, 93, 435 (1993), R. S. Davidson, Journal of Photochemistry and Biology A: Chemistry, 73, 81 (1993), J. P. Faussier "Photoinitiated Polymerization-Theory and Applications": Rapra Review, Vol. 9, Report, Rapra Technology (1998), and M. Tsunooka et al., Prog. Polym. Sci., 21, 1 (1996).

Furthermore, many compounds utilized in chemically amplified photoresists and cationic photopolymerization, etc. are described in 'Imejingu yo Yukizairyou' (Organic Materials for Imaging) Ed. Japanese Research Association for Organic Electronics Materials, Bunshin Publishing Co. (1993), pp. 187-192. Moreover, a group of compounds are known, as described in F. D. Saeva, Topics in Current Chemistry, 156, 59 (1990), G. G. Maslak, Topics in Current Chemistry, 168, 1 (1993), H. B. Shuster et al., J. Am. Chem. Soc., 112, 6329 (1990), I. D. F. Eaton et al., J. Am. Chem. Soc., 102, 3298 (1980), etc., that cause oxidative or reductive bond cleavage via interaction with an electronic excited state of a sensitizing dye.

Examples of the preferable photopolymerization initiator include (a) an aromatic ketone, (b) an aromatic onium salt compound, (c) an organic peroxide, (d) a hexaarylbiimidazole compound, (e) a ketoxime ester compound, (f) a borate compound, (g) an azinium compound, (h) a metallocene compound, (i) an active ester compound, and (j) a compound having a carbon-halogen bond.

Preferred examples of the aromatic ketone (a) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), include an α-thiobenzophenone compound described in JP-B-47-6416 (JP-B denotes a Japanese examined patent application publication), a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

As the aromatic onium salt compound (b), there can be cited aromatic onium salts of elements of Groups 15, 16, and 17 (Groups V B, VI B and VII B) of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (c), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (d), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

As the ketoxime ester compound (e), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (f) include compounds described in U.S. Pat. Nos. 3,567,453 and 4,343,891, and EP Nos. 109,772 and 109,773.

Examples of the azinium salt compound (g) include N—O bond-containing compounds described in JP-A-63-138345, JP-A-63-142345, JP-A-63-142346, JP-A-63-143537, and JP-B-46-42363.

Examples of the metallocene compound (h) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5,6-pentafluorophen-1-yl)titanium, bis(cyclopentadienyl)bis (2,3,5,6-tetrafluorophen-1-yl)titanium, bis (cyclopentadienyl)bis(2,4,6-trifluorophen-1-yl)titanium, bis (cyclopentadienyl)bis(2,6-difluorophen-1-yl)titanium, bis (cyclopentadienyl)bis(2,4-difluorophen-1-yl)titanium, bis (methylcyclopentadienyl)bis(2,3,4,5,6-pentafluorophen-1-yl)titanium, bis(methylcyclopentadienyl)bis(2,3,5,6-tetrafluorophen-1-yl)titanium, bis(methylcyclopentadienyl) bis(2,4-difluorophen-1-yl)titanium, bis(cyclopentadienyl) [2,6-difluoro-3-(pyrr-1-yl)phenyl]titanium, bis (cyclopentadienyl)bis[2,6-difluoro-3-(methylsulfonamido) phenyl]titanium, and bis(cyclopentadienyl)bis[2,6-difluoro-3-(N-butylbiaroylamino)phenyl]titanium.

Examples of the active ester compound (i) include nitrobenzyl ester compounds described in EP Nos. 0290750, 046083, 156153, 271851, and 0388343, U.S. Pat. Nos. 3,901, 710 and 4,181,531, JP-A-60-198538, and JP-A-53-133022, iminosulfonate compounds described in EP Nos. 0199672, 84515, 199672, 044115, and 0101122, U.S. Pat. Nos. 4,618, 564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (j) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

Specific examples of the compounds represented by (a) to (j) above are listed below. In the specific examples below, Ph denotes a phenyl group, and Ar denotes any aryl group.

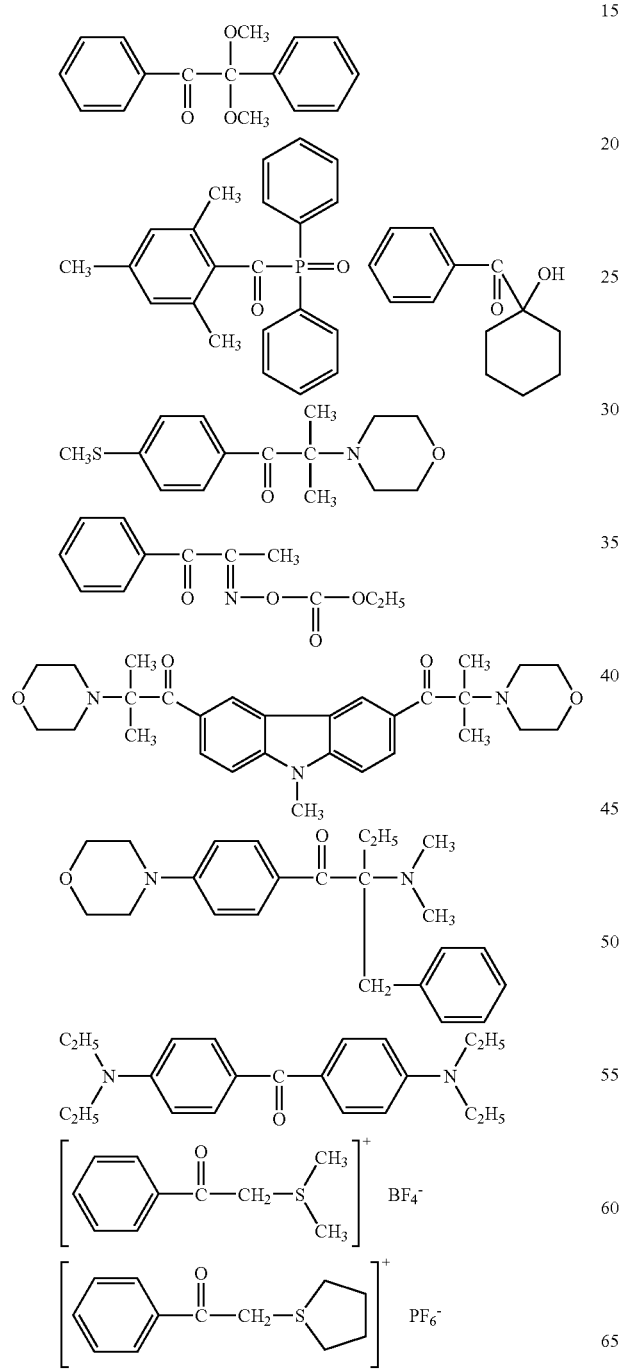
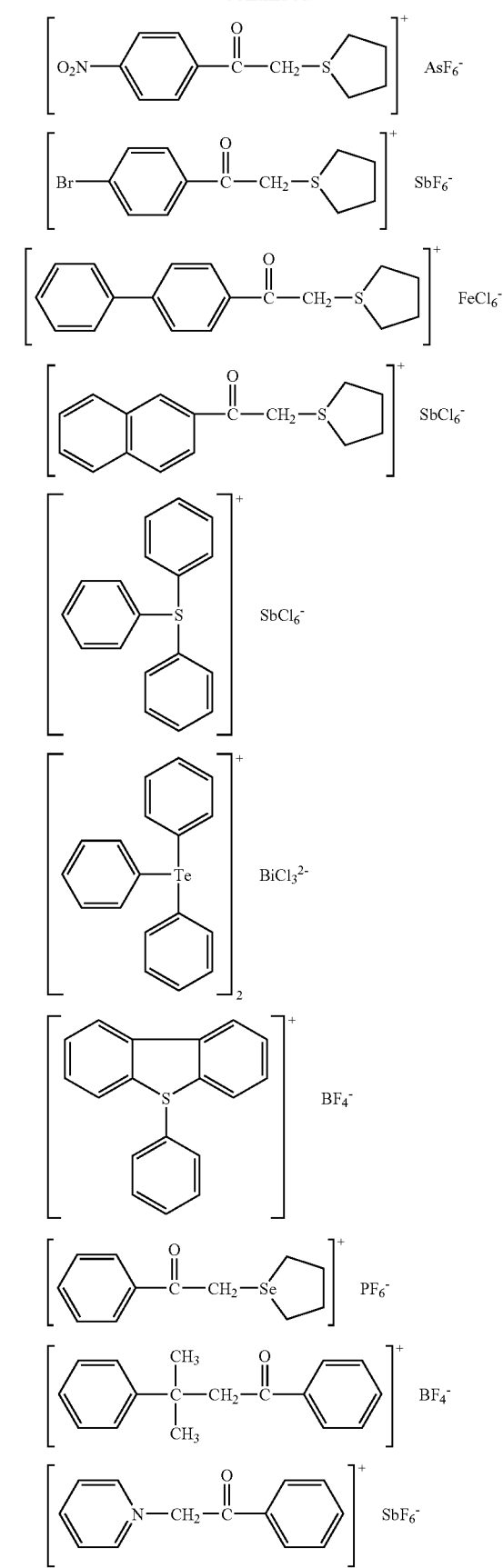

-continued
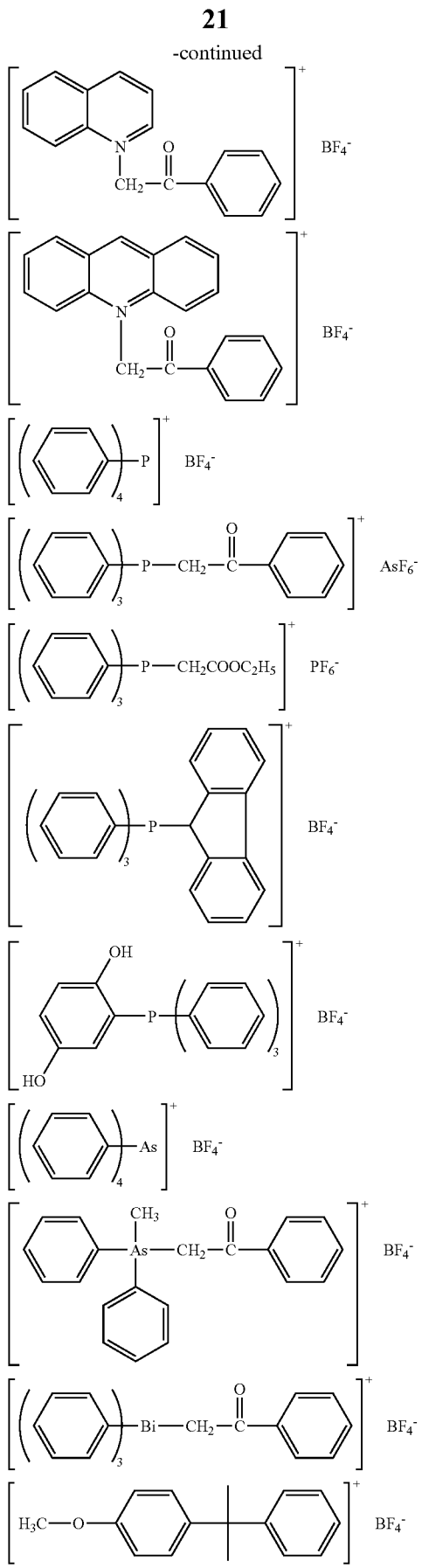
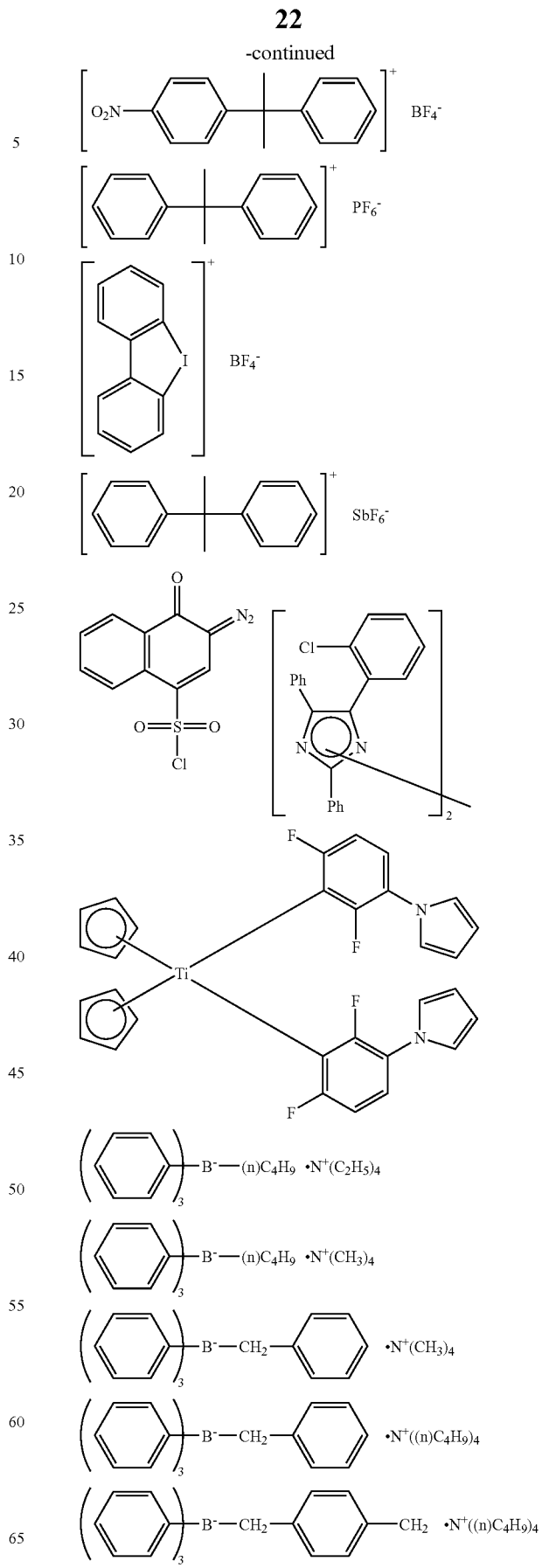

-continued
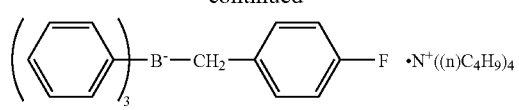
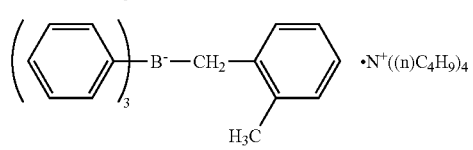
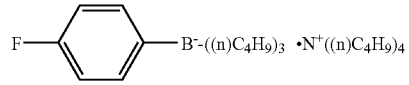
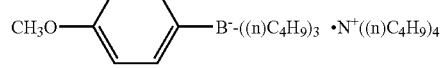
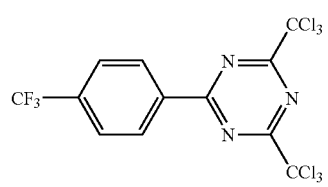
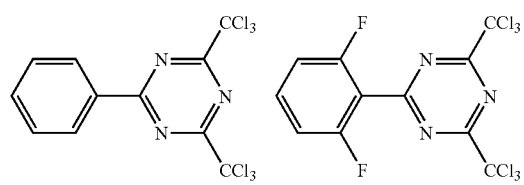
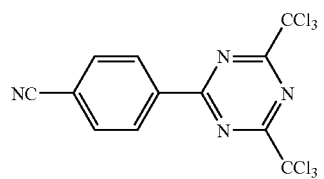
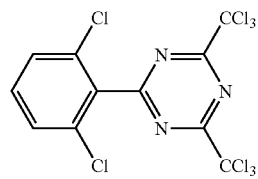
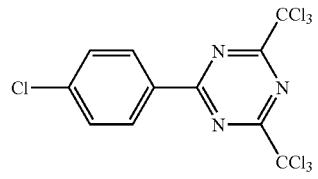
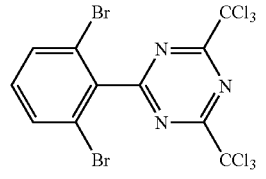
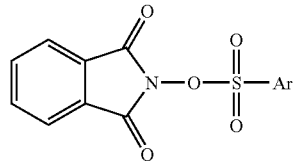
-continued
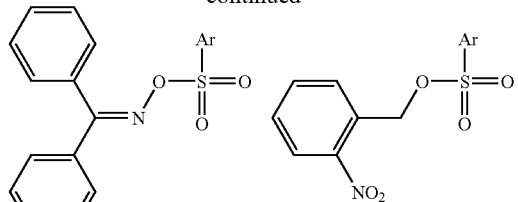
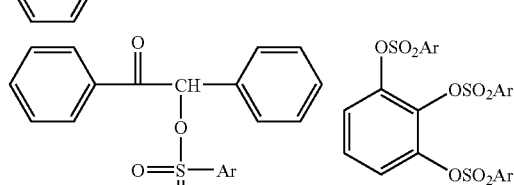
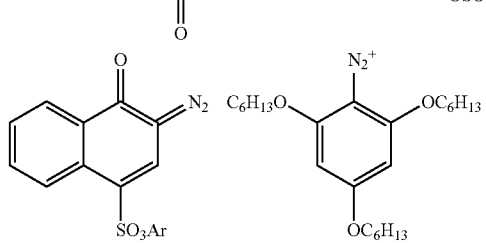
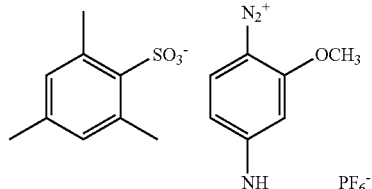
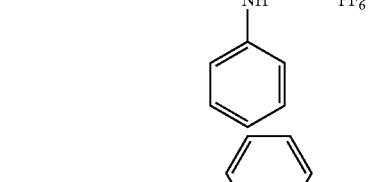
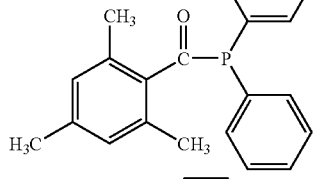
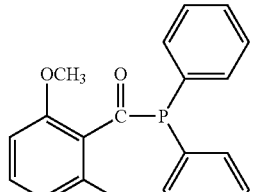
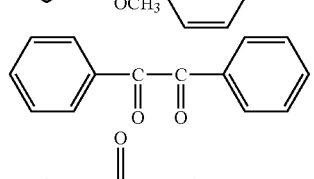
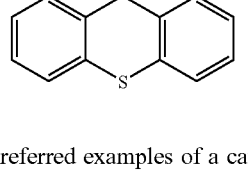
Preferred examples of a cationic polymerization initiator (preferably a photo-acid generator) include onium salt compounds such as diazonium salts, phosphonium salts, sulfonium salts, and iodonium salts, and sulfonate compounds such as imidosulfonates, oxime sulfonates, diazodisulfones, disulfones, and o-nitrobenzylsulfonates, which generate an acid by decomposition when exposed to radiation.

Furthermore, as the cationic polymerization initiator, from the viewpoint of curability, an aromatic onium salt is preferable among those described above, an iodonium salt and a sulfonium salt are more preferable, and an iodonium $PF_6$ salt and a sulfonium $PF_6$ salt are particularly preferable.

As the radical polymerization initiator, from the viewpoint of curability, an aromatic ketone is preferable among those described above, a compound having a benzophenone skeleton or a thioxanthone skeleton is more preferable, and an α-aminobenzophenone compound, an α-hydroxybenzophenone compound and an acylphosphine sulfide compound are particularly preferable. In the present invention, it is preferable that the combination of an α-hydroxybenzophenone compound and an α-aminobenzophenone compound is contained as a polymerization initiator.

Furthermore, in the present invention, from the viewpoint of internal curability of the coating being improved, preferably an acylphosphine oxide is contained as a polymerization initiator. Furthermore, more preferably the combination of an acylphosphine oxide and an α-aminobenzophenone compound is contained as a polymerization initiator.

Preferred examples of an acylphosphine oxide are shown below.

Acylphosphine Oxide Compound

As the acylphosphine oxide compound, a compound represented by Formula (2) or Formula (3) below is preferable.

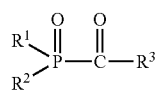

(2)

$R^1$ and $R^2$ in Formula (2) above independently denote an aliphatic group, an aromatic group, an aliphatic oxy group, an aromatic oxy group, or a heterocyclic group, and $R^3$ denotes an aliphatic group, an aromatic group, or a heterocyclic group. $R^1$ and $R^2$ above may be bonded to form a 5-membered to 9-membered ring. The ring structure may be a heterocycle having in the ring structure an oxygen atom, a nitrogen atom, a sulfur atom, etc.

Examples of the aliphatic group represented by $R^1$, $R^2$, or $R^3$ above include an alkyl group, a substituted alkyl group, an alkenyl group, a substituted alkenyl group, an alkynyl group, a substituted alkynyl group, an aralkyl group, and a substituted aralkyl group; among them, an alkyl group, a substituted alkyl group, an alkenyl group, a substituted alkenyl group, an aralkyl group, and a substituted aralkyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight chain, branched, and cyclic alkyl groups, and the number of carbons in the alkyl group is preferably at least 1 but no greater than 30, and more preferably at least 1 but no greater than 20. A preferred range for the number of carbons in the alkyl moiety of the substituted alkyl group is the same as for the alkyl group above. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, an cyclopentyl group, a neopentyl group, an isopropyl group, and an isobutyl group.

Examples of the substituent of the substituted alkyl group include —COOH (carboxyl group), —$SO_3H$ (sulfo group), —CN (cyano group), a halogen atom (e.g. a fluorine atom, a chlorine atom, a bromine atom), —OH (hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group, an alkylsulfonyl group, an arylsulfonyl group, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group), an alkylthio group having no greater than 30 carbons (e.g. a methylthio group, an ethylthio group, a methylthioethylthioethyl group), an aryloxy group having no greater than 30 carbons (e.g. a phenoxy group, a p-tolyloxy group, a 1-naphthoxy group, a 2-naphthoxy group), a nitro group, an alkoxycarbonyloxy group, an aryloxycarbonyloxy group, an acyloxy group having no greater than 30 carbons (e.g. an acetyloxy group, a propionyloxy group), an acyl group having no greater than 30 carbons (e.g. an acetyl group, a propionyl group, a benzoyl group), a carbamoyl group (e.g. a carbamoyl group, an N,N-dimethylcarbamoyl group, a morpholinocarbonyl group, a piperidinocarbonyl group), a sulfamoyl group (e.g. a sulfamoyl group, an N,N-dimethylsulfamoyl group, a morpholinosulfonyl group, a piperidinosulfonyl group), an aryl group having no greater than 30 carbons (e.g. a phenyl group, a 4-chlorophenyl group, a 4-methylphenyl group, an α-naphthyl group), a substituted amino group (e.g. an amino group, an alkylamino group, a dialkylamino group, an arylamino group, a diarylamino group, an acylamino group), a substituted ureido group, a substituted phosphono group, and a heterocyclic group. Here, the carboxyl group, the sulfo group, the hydroxy group, and the phosphono group may be in the form of a salt. In this case, a cation forming the salt is a group that can form a positive ion, and is preferably an organic cationic compound, a transition metal coordination complex cation (a compound described in Japanese registered patent No. 2791143, etc.), or a metal cation (e.g. $Na^+$, $K^+$, $Li^+$, $Ag^+$, $Fe^{2+}$, $Fe^{3+}$, $Cu^+$, $Cu^{2+}$, $Zn^{2+}$, $Al^{3+}$).

Examples of the alkenyl group include straight chain, branched, and cyclic alkenyl groups, and the number of carbons of the alkenyl group is preferably at least 2 but no greater than 30, and more preferably at least 2 but no greater than 20. Furthermore, the alkenyl group may be an unsubstituted alkenyl group or a substituted alkenyl group having a substituent, and a preferred range for the number of carbons in the alkenyl moiety of the substituted alkenyl group is the same as for the alkenyl group above. Examples of the substituent of the substituted alkenyl group include the same substituents as for the above substituted alkyl group.

Examples of the alkynyl group include straight chain, branched, and cyclic alkynyl groups, and the number of carbons of the alkynyl group is preferably at least 2 but no greater than 30, and more preferably at least 2 but no greater than 20. Furthermore, the alkynyl group may be an unsubstituted alkynyl group or a substituted alkynyl group having a substituent, and a preferred range for the number of carbons in the alkynyl moiety of the substituted alkynyl group is the same as for the alkynyl group above. Examples of the substituent of the substituted alkynyl group include the same substituents as for the above substituted alkyl group.

Examples of the aralkyl group include aralkyl groups having a straight chain, branched, or cyclic alkyl side chain; the number of carbons of the aralkyl group is preferably at least 7 but no greater than 35, and more preferably at least 7 but no greater than 25. Furthermore, the aralkyl group may be an unsubstituted aralkyl group or a substituted aralkyl group having a substituent, and a preferred range for the number of carbons in the aralkyl moiety of the substituted aralkyl group is the same as for the aralkyl group above. Examples of the substituent of the substituted aralkyl group include the same substituents as for the above substituted alkyl group. Furthermore, the aryl moiety of the aralkyl group may have a substituent, and examples of the substituent include the same substituents as for the substituted alkyl group above and straight chain, branched, and cyclic alkyl groups having no greater than 30 carbons.

Examples of the aromatic group represented by $R^1$, $R^2$, or $R^3$ include an aryl group and a substituted aryl group. The number of carbons of the aryl group is preferably at least 6 but no greater than 30, and more preferably at least 6 but no greater than 20. A preferred range for the number of carbons in the aryl moiety of the substituted aryl group is the same as for the aryl group above. Examples of the aryl group include a phenyl group, an α-naphthyl group, and a β-naphthyl group. Examples of the substituent of the substituted aryl group include the same substituents as for the above substituted alkyl group, and straight chain, branched, and cyclic alkyl groups having no greater than 30 carbons.

The aliphatic oxy group represented by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group represented by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group represented by $R^1$, $R^2$, or $R^3$ above is preferably an N, O, or S atom-containing heterocyclic group, and examples thereof include a pyridyl group, a furyl group, a thienyl group, an imidazolyl group, and a pyrrolyl group.

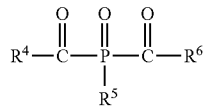

(3)

$R^4$ and $R^6$ in Formula (3) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$, or $R^6$ may have a substituent, and examples of the substituent include the same substituents as in the case of Formula (2) above.

The alkyl group, aryl group, heterocyclic group, alkoxy group, and aryloxy group in Formula (3) above are the same as those in Formula (2) above.

The compound represented by Formula (2) above is preferably a compound represented by Formula (4) below.

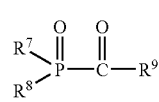

(4)

In Formula (4), $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluyl group), an isobutyl group, or a t-butyl group.

The compound represented by Formula (3) above is preferably a compound represented by Formula (5) below.

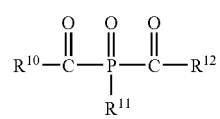

(5)

In Formula (5), $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (2) or (3) above include compounds described in JP-B-63-40799 (JP-B denotes a Japanese examined patent application publication), JP-B-5-29234, JP-A-10-95788, JP-A-10-29997, etc.

Specific examples of the acylphosphine oxide compound include the compounds shown below (compound examples (P-1) to (P-26)), but the present invention is not limited thereto.

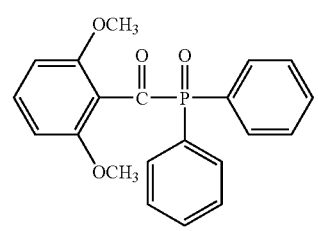

(P-1)

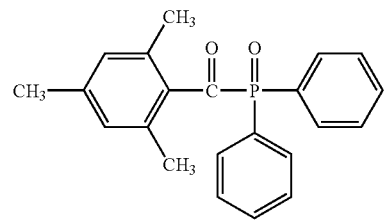

(P-2)

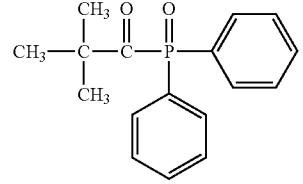

(P-3)

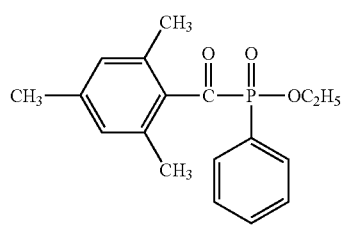
(P-4)
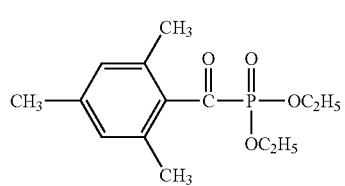
(P-5)
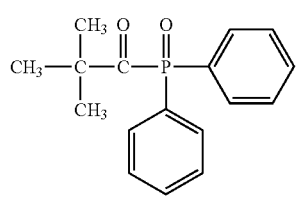
(P-6)
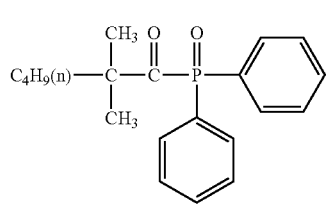
(P-7)
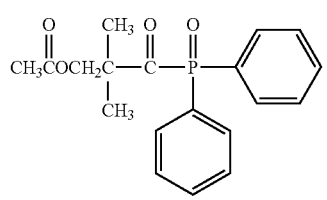
(P-8)
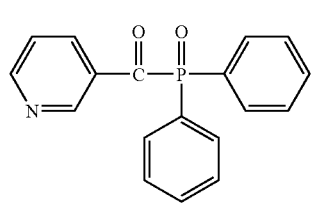
(P-9)
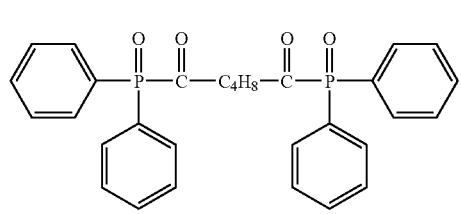
(P-10)
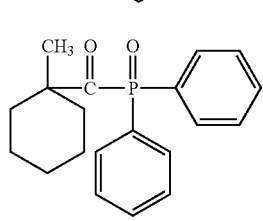
(P-11)
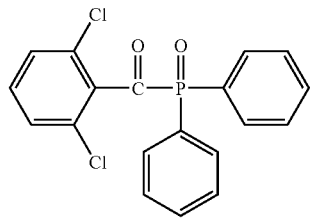
(P-12)
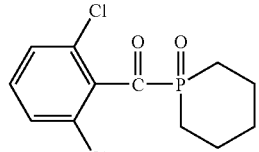
(P-13)
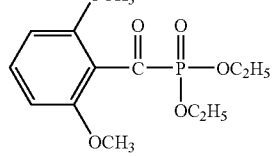
(P-14)
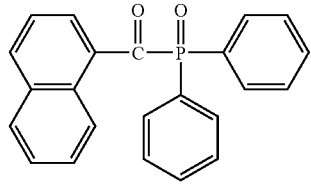
(P-15)
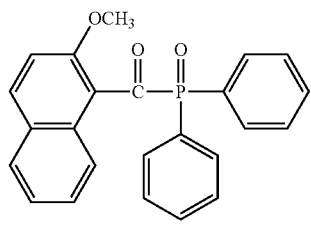
(P-16)
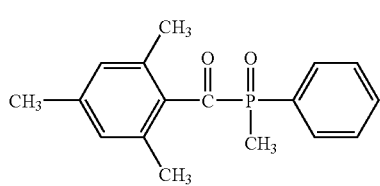
(P-17)
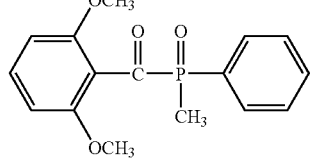
(P-18)
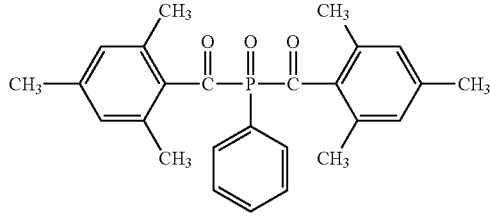
(P-19)

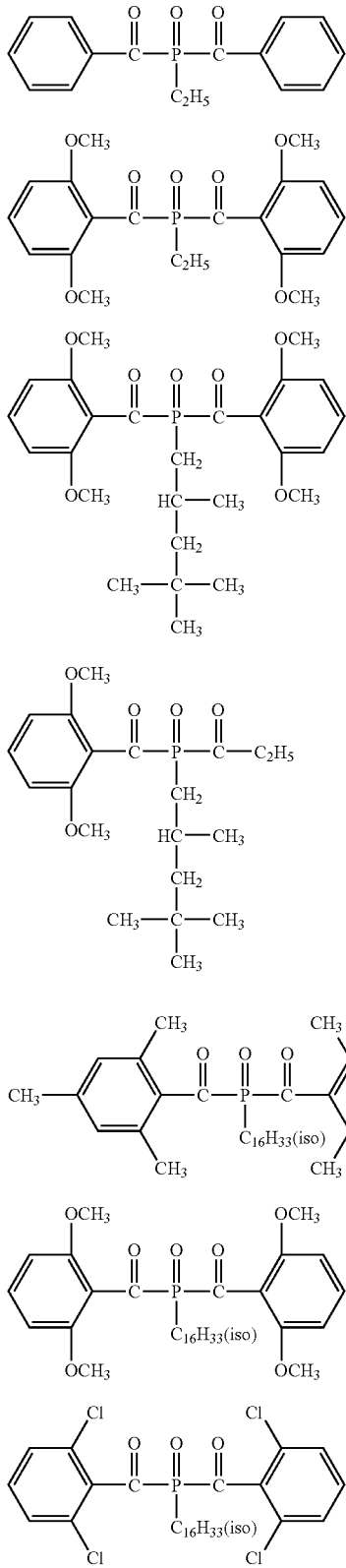

be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-toluyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoylbis(diphenylphosphine oxide), pivaloyldiphenylphosphine oxide, p-toluyldiphenylphosphine oxide, 4-(t-butyl)benzoyldiphenylphosphine oxide, 2-methylbenzoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present invention, bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, 2,4,6-trimethylbenzoyldiphenylphosphine oxide (DAROCUR TPO: manufactured by Ciba Specialty Chemicals, LUCIRIN TPO: manufactured by BASF), etc. are preferable.

When the acylphosphine oxide compound is used in the ink composition of the present invention, the concentration of the acylphosphine oxide comopound added is preferably at least 1 wt % but no greater than 15 wt % relative to the total weight of the ink composition, more preferably at least 2 wt % but no greater than 12 wt %, and particularly preferably at least 3 wt % but no greater than 10 wt %.

As the acylphosphine oxide compound, a monoacylphosphine oxide compound, a bisacylphosphine oxide compound, etc. may be used, and as the monoacylphosphine oxide compound, a known monoacylphosphine oxide compound may With regard to the polymerization initiator, one type thereof may be used on its own or two or more types may be used in combination. They may be used in a combination with a known sensitizer for the purpose of improving sensitivity as long as the effects of the present invention are not impaired.

The content of the polymerization initiator in the ink composition, relative to the total weight of the ink composition of the present invention, is preferably 0.1 to 20.0 wt %, more preferably 0.5 to 18.0 wt %, and yet more preferably 1.0 to 15.0 wt %. When the amount of polymerization initiator added is in the above-mentioned range, the curability is excellent and it is appropriate from the viewpoint of suppression of surface tackiness.

Furthermore, with regard to the content ratio (ratio by weight) of the polymerization initiator to the polymerizable compound used in combination therewith, it is preferable that polymerization initiator:polymerizable compound=0.5:100 to 30:100, more preferably 1:100 to 15:100, and yet more preferably 2:100 to 10:100.

(F) Other Colorant

The ink composition of the present invention may comprise (F) another colorant in addition to an isoindoline-based pigment.

From the viewpoint of lightness and saturation in an image obtained, the ink composition of the present invention preferably does not contain a colorant other than an isoindoline-based pigment or the content of a colorant other than an isoindoline-based pigment is preferably no greater than 1 wt % relative to the total weight of the ink composition, and more preferably it does not contain a colorant other than an isoindoline-based pigment.

The other colorant that can be used in the present invention is not particularly limited, and various known pigments and dyes may be selected appropriately according to an intended application. Among them, as a colorant, a pigment is particularly preferable from the viewpoint of excellent light fastness.

Pigments that are preferably used in the present invention except the isoindoline-based pigment are described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as C.I. Pigment Yellow 1 (Fast Yellow G, etc.) and C.I. Pigment Yellow 74, disazo pigments such as CI Pigment Yellow 12 (Disazo Yellow AAA, etc.) and C.I. Pigment Yellow 17, benzidine-free azo pigments such as C.I. Pigment Yellow 180 and C.I. Pigment Yellow 200 (Novoperm Yellow 2HG), azo lake pigments such as CI Pigment Yellow 100 (Tartrazine Yellow Lake, etc.), condensed azo pigments such as C.I. Pigment Yellow 95 (Azo Condensation Yellow GR, etc.), acidic dye lake pigments such as C.I. Pigment Yellow 115 (Quinoline Yellow Lake, etc.), basic dye lake pigments such as C.I. Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), nitroso pigments such as C.I. Pigment Yellow 153 (Nickel Nitroso Yellow, etc.), and metal complex azomethine pigments such as C.I. Pigment Yellow 117 (Copper Azomethine Yellow, etc.).

Examples of pigments exhibiting a red or magenta color include monoazo pigments such as C.I. Pigment Red 3 (Toluidine Red, etc.), disazo pigments such as CI Pigment Red 38 (Pyrazolone Red B, etc.), azo lake pigments such as C.I. Pigment Red 53:1 (Lake Red C, etc.) and C.I. Pigment Red 57:1 (Brilliant Carmine 6B), condensed azo pigments such as C.I. Pigment Red 144 (Azo Condensation Red BR, etc.), acidic dye lake pigments such as C.I. Pigment Red 174 (Phloxine B Lake, etc.), basic dye lake pigments such as C.I. Pigment Red 81 (Rhodamine 6G' Lake, etc.), anthraquinone pigments such as C.I. Pigment Red 177 (Dianthraquinonyl Red, etc.), thioindigo pigments such as C.I. Pigment Red 88 (Thioindigo Bordeaux, etc.), perinone pigments such as C.I. Pigment Red 194 (Perinone Red, etc.), perylene pigments such as C.I. Pigment Red 149 (Perylene Scarlet, etc.), quinacridone pigments such as C.I. Pigment violet 19 (unsubstituted quinacridone, CINQUASIA Magenta RT-355T; manufactured by Ciba Specialty Chemicals) and C.I. Pigment Red 122 (Quinacridone Magenta, etc.), isoindolinone pigments such as C.I. Pigment Red 180 (Isoindolinone Red 2BLT, etc.), and alizarin lake pigments such as C.I. Pigment Red 83 (Madder Lake, etc.).

Examples of pigments exhibiting a blue or cyan color include disazo pigments such as C.I. Pigment Blue 25 (Dianisidine Blue, etc.), phthalocyanine pigments such as C.I. Pigment Blue 15 and C.I. Pigment Blue 15:3 (IRGALITE BLUE GLO; manufactured by Ciba Specialty Chemicals) (Phthalocyanine Blue, etc.), acidic dye lake pigments such as C.I. Pigment Blue 24 (Peacock Blue Lake, etc.), basic dye lake pigments such as C.I. Pigment Blue 1 (Victoria Pure Blue BO Lake, etc.), anthraquinone pigments such as C.I. Pigment Blue 60 (Indanthrone Blue, etc.), and alkali blue pigments such as C.I. Pigment Blue 18 (Alkali Blue V-5:1).

Examples of pigments exhibiting a green color include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of pigments exhibiting an orange color include isoindoline-based pigments such as C.I. Pigment Orange 66 (Isoindoline Orange) and anthraquinone pigments such as C.I. Pigment Orange 51 (Dichloropyranthrone Orange).

Examples of pigments exhibiting a black color include carbon black, titanium black, and aniline black. Examples of the carbon black include SPECIAL BLACK 250 (manufactured by Degussa).

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a bead mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the colorant, a dispersant such as a surfactant may be added.

Furthermore, when the colorant is added, as a dispersion adjuvant, it is also possible to use a synergist as necessary according to the various types of colorant. The dispersant and dispersion adjuvant are preferably used at at least 1 part by weight but no greater than 50 parts by weight relative to 100 parts by weight of the colorant.

In the photocurable composition, a solvent may be added as a dispersion medium for various components such as the colorant, or the polymerizable compound, which is a low molecular weight component, may be used as a dispersion medium without using a solvent, and since the photocurable composition of the present invention and especially the ink composition of the present invention are preferably an actinic radiation curing type liquid and the ink composition is cured after being applied on top of a recording medium, it is preferable for it to be solvent-free. This is because, if solvent remains in the image formed from the cured ink composition, the solvent resistance is degraded and the VOC (Volatile Organic Compound) problem of residual solvent occurs. From this viewpoint, it is preferable to use the polymerizable compound as a dispersion medium and it is particularly preferable to select a polymerizable compound having the lowest viscosity in terms of improvement of dispersion suitability and handling properties of an ink composition.

Since excellent coloration is achieved by finer particles, it is preferable for the average particle size of the colorant used here to be at least 0.01 μm but no greater than 0.4 μm, and more preferably at least 0.02 μm but no greater than 0.2 μm. In order to make the maximum particle size be no greater than 3 μm, and preferably no greater than 1 μm, it is preferable for the colorant, the dispersant, and the dispersion medium to be selected, and dispersion conditions and filtration conditions to be set. By such control of particle size, clogging of a head nozzle can be suppressed, and the storage stability of the photocurable composition and the ink composition, and the transparency and curing sensitivity of the photocurable composition and the ink composition can be maintained. In the present invention, by using a dispersant having excellent dispersibility and stability, even when a microparticulate colorant is used, a uniform and stable dispersion is obtained.

The particle size of the colorant in the photocurable compound and the ink composition may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

(G) Surfactant

The ink composition of the present invention preferably comprises a surfactant (G).

Examples of the surfactant used in the present invention include the surfactants below.

For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. As the above known surfactants, an organofluoro compound may be used. The organofluoro compound is preferably hydrophobic. Examples of the organofluoro compound include fluorine-based surfactants, oil-like fluorine-based compounds (e.g. fluorine oils), and solid fluorine compound resins (e.g. tetrafluoroethylene resin), and those described in JP-B-57-9053 (8th to 17th columns) and JP-A-62-135826.

The surfactant used in the present invention is not particularly limited to the surfactants described above, and it may be an additive that, for the concentration added, is capable of reducing the surface tension efficiently.

(H) Other Additives

The ink composition in the present invention may comprise, in addition to the above-mentioned compounds, various other types of additive according to the intended purpose.

For example, from the viewpoint of improving the weatherability of an image that is obtained, a UV absorber may be used. Furthermore, in order to improve the storage stability, an antioxidant may be added.

Moreover, it is possible to add various types of organic and metal complex antifading agents, a conductive salt such as potassium thiocyanate, lithium nitrate, ammonium thiocyanate, or dimethylamine hydrochloride for the purpose of controlling discharge physical properties, or a trace amount of an organic solvent in order to improve the adhesion between an ink composition and a substrate.

Furthermore, various types of high molecular weight compounds may be added in order to adjust coating physical properties. Examples of the high molecular weight compounds include acrylic polymers, polyvinylbutyral resins, polyurethane resins, polyamide resins, polyester resins, epoxy resins, phenolic resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting coating physical properties, or a tackifier that does not inhibit polymerization in order to improve the adhesion to a polyolefin, polyethylene terephthalate (PET), etc.

Properties of the Ink Composition

The ink composition of the present invention is preferably a liquid at room temperature, and from the viewpoint of suitability for firing droplets in inkjet, it is more preferable that the viscosity at 25° C. is no greater than 100 mPa·s or the viscosity at 60° C. is no greater than 30 mPa·s, it is more preferable that the viscosity at 25° C. is no greater than 60 mPa·s or the viscosity at 60° C. is no greater than 20 mPa·s, and it is yet more preferable that the viscosity at 25° C. is no greater than 40 mPa·s or the viscosity at 60° C. is no greater than 15 mPa·s.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

Furthermore, from the viewpoint of suitability for firing droplets in inkjet, it is preferable that the surface tension at 25° C. of the ink composition of the present invention is preferably at least 18 mN/m but no greater than 40 mN/m, more preferably at least 20 mN/m but no greater than 35 mN/m, and yet more preferably at least 22 mN/m but no greater than 32 mN/m.

The surface tension of the ink composition of the present composition is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

(2) Pigment Dispersion for Ink Compositions

A pigment dispersion for ink compositions (hereinafter called simply a 'pigment dispersion') of the present invention comprises (A) an isoindoline-based pigment, (B) a polymeric dispersant, and (C) an alkylammonium salt of a sulfonated derivative of a disazo-based yellow colorant.

The pigment dispersion of the present invention preferably comprises (D) a polymerizable compound.

The pigment dispersion of the present invention may further comprise (F) another colorant, (G) a surfactant, and (H) another additive.

Components (A) to (D) and (F) to (H) have the same meanings as those of the ink composition and preferred ranges are also the same.

Furthermore, a pigment dispersion for the ink composition of the present invention is preferably obtained by steps of adding (A) an isoindoline-based pigment, (B) a polymeric dispersant, and (C) an alkylammonium salt of a sulfonated derivative of a disazo-based yellow colorant to (D) a polymerizable compound, and dispersing them.

From the viewpoint of the dispersibility of the pigment and the concentration of free dispersant being decreased, the content of the polymeric dispersant in the ink composition of the present invention is preferably at least 1 wt % but no greater than 50 wt % relative to the total weight of the pigment in the ink composition, more preferably at least 2 wt % but no greater than 30 wt %, and particularly preferably at least 5 wt % but no greater than 20 wt %.

The content of the alkylammonium salt of the sulfonated derivative of the disazo-based yellow colorant in the ink composition of the present invention is preferably at least 0.1 wt % but no greater than 10 wt % relative to the total weight of the pigment in the ink composition, more preferably at least 0.2 wt % but no greater than 5 wt %, and particularly preferably at least 0.5 wt % but no greater than 3 wt %.

(3) Inkjet Recording Method, Inkjet Recording System, and Printed Material

The inkjet recording method of the present invention is a method in which the ink composition of the present invention is discharged onto a recording medium (support, recording material, etc.) for inkjet recording, and the ink composition discharged onto the recording medium is irradiated with actinic radiation to thus cure the ink and form an image.

More specifically, the inkjet recording method of the present invention preferably comprises ($a^1$) a step of discharging an ink composition onto a recording medium; and ($b^1$) a step of curing the ink composition by irradiating the discharged ink composition with actinic radiation.

Since the inkjet recording method of the present invention comprises steps ($a^1$) and ($b^1$) above, an image is formed by the ink composition cured on the recording medium.

Moreover, the printed material of the present invention is a printed material in which recording is carried out by the inkjet recording method of the present invention.

The step ($a^1$) of the inkjet recording method of the present invention may employ an inkjet recording system that will be described in detail below.

Inkjet Recording System

The inkjet recording system used in the inkjet recording method of the present invention is not particularly limited, and a known inkjet recording system that can achieve a target resolution may be freely selected and used. That is, any known inkjet recording system, including a commercial system, may be used for carrying out ink discharge onto a recording medium in step ($a^1$) of the inkjet recording method of the present invention.

Examples of the inkjet recording system that can be used in the present invention include a system that comprises an ink supply system, a temperature sensor, and an actinic radiation source.

The ink supply system comprises, for example, a main tank containing the ink composition of the present invention, a supply pipe, an ink supply tank immediately before an inkjet head, a filter, and a piezo type inkjet head. The piezo type inkjet head is driven so as to discharge multisize dots of preferably 1 to 100 pL, and more preferably 8 to 30 pL, at a resolution of preferably 320×320 to 4,000×4,000 dpi, more preferably 400×400 to 1,600×1,600 dpi, and particularly preferably 720×720 dpi. Here, dpi referred to in the present invention denotes the number of dots per 2.54 cm.

As described above, since for the ink composition of the present invention, the temperature of the discharged ink composition is desirably constant, the inkjet recording system is preferably equipped with means for stabilizing the temperature of the ink composition. The section for which the temperature is made constant includes the whole of a piping system and all of the members from an ink tank (middle tank where it is present) to a nozzle injection face. That is, a section from an ink supply tank to an inkjet head portion can be thermally insulated and heated.

A method for temperature control is not particularly limited, and it is preferable to provide, for example, a plurality of temperature sensors at each pipe section and control heating according to ink flow rate and environmental temperature. The temperature sensors may be provided at the ink supply tank and in the vicinity of an inkjet head nozzle. Furthermore, it is preferable that a head unit that is heated is thermally shielded or insulated so that the system main body is not affected by the outside temperature. In order to reduce the printer start-up time required for heating or suppress loss of thermal energy, it is preferable to thermally insulate the heating unit from other sections and decrease the overall thermal capacity thereof When the ink composition of the present invention is discharged using the above mentioned inkjet recording system, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is desirably ±5° C. of a set temperature, preferably ±2° C. of the set temperature, and more preferably ±1° C. of the set temperature.

The step ($b^1$) of curing the ink composition by irradiating the discharged ink composition with actinic radiation is now explained.

The ink composition discharged onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include $\alpha$ rays, $\gamma$ rays, an electron beam, X rays, UV rays, visible light, and IR rays. Although it depends on the absorption characteristics of the sensitizer, the peak wavelength of the actinic radiation is, for example, 200 to 600 nm, preferably 300 to 450 nm, and more preferably 320 to 420 nm and it is more preferable that the actinic radiation is UV rays having the peak wavelength of 340 to 400 nm.

Furthermore, the polymerization initiation system of the ink composition of the present invention has sufficient sensitivity for low output actinic radiation. The actinic radiation is applied therefore so that the illumination intensity on the exposed surface is, for example, 10 to 4,000 $mW/cm^2$, and preferably 20 to 2,500 $mW/cm^2$.

As an actinic radiation source, a mercury lamp, a gas/solid laser, etc. are mainly used, and for UV photocuring inkjet recording ink composition, a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 340 to 400 nm is particularly preferable.

The maximum illumination intensity of the LED on a recording medium is preferably 10 to 2,000 $mW/cm^2$, more preferably 20 to 1,000 $mW/cm^2$, and particularly preferably 50 to 800 $mJ/cm^2$.

The ink composition of the present invention is desirably exposed to such actinic radiation for 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light, and such curing methods like this can also be applied to the inkjet recording method of the present invention.

By employing the above-mentioned inkjet recording method, it is possible to keep the diameter of landed ink composition dots constant even for various recording media having different surface wettability, thus improving the image quality. In order to obtain a color image, it is preferable to overlap in order from low lightness colors. By overlapping in order from low lightness ink compositions, it becomes easy for radiation to reach ink composition in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

In this way, the ink composition of the present invention cures with high sensitivity upon exposure to actinic radiation, and a hydrophobic image is formed on the surface of a recording medium.

In the inkjet recording method of the present invention, it is preferable to use the ink composition of the present invention as a yellow ink composition.

The ink composition of the present invention is preferably used as an ink set comprising a plurality of inkjet recording inks, and in this case it is preferable to form an ink set by using the ink composition in combination with inks exhibiting cyan, magenta, and black colors, and as necessary an ink exhibiting a white color.

The order in which colored ink compositions are discharged in the inkjet recording method of the present invention is not particularly limited, but it is preferable to apply to a recording medium from a colored ink composition having a low lightness; when the ink composition of the present invention, cyan, magenta, and black ink compositions are used, they are preferably applied on top of the recording medium in the order the ink composition of the present invention→cyan→magenta→black. Furthermore, when white is additionally used, they are preferably applied on top of the recording medium in the order white→the ink composition of the present invention→cyan→magenta→black. Moreover, the present invention is not limited thereto, and an ink set comprising a total of eight colors, that is, the ink composition of the present invention, and light cyan, light magenta, cyan, magenta, light black (gray), black and white ink compositions may preferably be used, and in this case they are applied on top of the recording medium in the order white→light cyan→light magenta→light black→the ink composition of the present invention→ cyan→ magenta→black.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyvinyl chloride, polyethylene terephthalate, polyethylene, polystyrene, polypropylene, polycarbonate, polyvinylacetal, etc.), and paper, plastic film laminated or vapor-deposited with the above metal or adhesive sheet. In the present invention, as the recording medium, a non-absorbing recording medium may suitably be used. Above all, from the viewpoint of adhesion, the ink composition of the present invention is suitable for recording on the non-absorbing recording medium of plastic film, and particullarly suitable for recording on those of plastic films such as polyvinyl chloride, polyethylene terephthalate, etc.

As an inkjet recording system that can be used in the present invention, for example, an inkjet recording system 10 shown in FIG. 1 can be cited.

FIG. 1 is a schematic diagram illustrating one example of an inkjet recording system that can be used in the present invention.

The inkjet recording system 10 comprises an inkjet recording head unit part 12 that can carry out discharge of an ink composition and irradiation with UV, a head maintenance/cleaning box 14 that enables maintenance or cleaning of an inkjet head to be carried out, a head reciprocation power part 16 equipped with a tube for supplying the ink composition and an electrical system cable for operating the inkjet head, a head fixing shaft 18 for fixing a distance between the inkjet head and a recording medium, a controlling personal computer 20 for controlling the overall operation of the inkjet recording system 10 such as operation of the inkjet head, supply of the ink composition, and supply of a recording medium 26, a recording medium suction stage 22 for carrying out inkjet recording on the recording medium 26, an ink tank 24 for storing the ink composition, and a recording medium transport roller 28 and a recording medium wind-up roller 30 for carrying out in cooperation supply of recording medium to the recording medium suction stage 22, etc.

The controlling personal computer 20 and each part of the inkjet recording system 10 are connected via various types of cables (not illustrated), including the electrical system cable within the head reciprocation power part 16.

Furthermore, the ink tank 24 may store five types of ink compositions. The recording medium 26 is supplied onto the recording medium suction stage 22 by means of the recording medium transport roller 28 and the recording medium wind-up roller 30, and inkjet recording is carried out on the recording medium suction stage 22 by means of the inkjet recording head unit part 12.

FIG. 2 is an enlarged schematic diagram of the inkjet recording head unit part 12 in the inkjet recording system 10 shown in FIG. 1.

The inkjet recording head unit part 12 comprises five inkjet heads for each of the colors (a white ink composition inkjet head W, a cyan ink composition inkjet head C, a magenta ink composition inkjet head M, an inkjet head Y for the ink composition of the present invention, and a black ink composition inkjet head K), and UV irradiation metal halide lamps 32 for opposite sides of the five inkjet heads, and the five inkjet heads (W, C, M, Y, K) for each of the colors and the two UV irradiation metal halide lamps 32 move on the head fixing shaft 18 as a unit.

Ink compositions of each color are supplied from the ink tank 24 to the respective inkjet heads via tubes within the head reciprocation power part 16.

The ink compositions discharged onto the recording medium 26 via the five inkjet heads (W, C, M, Y, K) for each color may be cured by the UV irradiation metal halide lamp 32 of either side.

In accordance with the present invention, there can be provided an ink composition and an inkjet recording method for which inkjet dischargeability, long-term stability, and curability are excellent, and for which an image formed has excellent saturation.

Examples

The present invention is explained in detail below by reference to Examples, but the present invention is not limited thereto.

Preparation of Yellow Pigment Dispersion

Yellow pigment dispersions A to I were prepared via a pre-dispersion step and a main dispersion step.

Pre-dispersion step: The components shown in Table 1 were mixed, and stirred using a stirrer for 1 hour.

Main dispersion step: After stirring, the mixture was dispersed by means of bead mill dispersion, thus giving a pigment dispersion. Dispersion was carried out under conditions of 0.65 mm diameter zirconia beads packed at a packing ratio of 70%, a peripheral speed of 9 m/s, and a dispersion time of 2 to 8 hours.

TABLE 1

| Composition (parts by weight) | Yellow Pigment Dispersion | | | | | | | | |
|---|---|---|---|---|---|---|---|---|---|
| | A | B | C | D | E | F | G | H | I |
| Yellow Pigment A | 30.0 | 30.0 | — | 30.0 | 30.0 | 30.0 | 30.0 | 30.0 | 20.0 |
| Yellow Pigment B | — | — | 30.0 | — | — | — | — | — | — |
| Polymerizable Compound A | 35.5 | 50.5 | 35.5 | 39.0 | 54.0 | 54.0 | 54.0 | 38.5 | 39.0 |
| Commercial Dispersant 1 | 30.0 | — | 30.0 | 30.0 | — | — | — | 30.0 | 20.0 |
| Commercial Dispersant 2 | — | 15.0 | — | — | 15.0 | — | — | — | — |
| Commercial Dispersant 3 | — | — | — | — | — | 15.0 | — | — | — |
| Commercial Dispersant 4 | — | — | — | — | — | — | 15.0 | — | — |
| Compound A | 3.5 | — | 3.5 | — | — | — | — | 0.5 | 20.0 |
| Compound B | — | 3.5 | — | — | — | — | — | — | — |
| Polymerization Inhibitor A | 1.0 | 1.0 | 1.0 | 1.0 | 1.0 | 1.0 | 1.0 | 1.0 | 1.0 |

(Materials Used for Preparing the Yellow Pigment Dispersions)

Yellow Pigment A: Paliotol Yellow D1155 (C. I. Pigment Yellow 185; manufactured by BASF Corp.)

Yellow Pigment B: NOVOPERM YELLOW PHG (C. I. Pigment Yellow 180)

Polymerizable Compound A: Propoxylated neopentyl glycol diacrylate (NPGPODA)

Polymerization Inhibitor A: FIRSTCURE ST-1 (manufactured by Albemarle Corp.)

Commercial Dispersant 1: DISPERBYK-168 (manufactured by BYK-Chemie GmbH)

Commercial Dispersant 2: AJISPER PB-822 (manufactured by Ajinomoto Fine-Techno Co.)

Commercial Dispersant 3: Solsperse 32000 (manufactured by Lubrizol Corp.)

Commercial Dispersant 4: AJISPER PB-821 (manufactured by Ajinomoto Fine-Techno Co.)

Compound A: a compound for which $R^1$=$CH_3$, $R^2$=$CH_3$, $R^3$=$C_{16}H_{33}$, $R_4$=$C_{18}H_{37}$, and m+n=1 in Formula (1) and Formula (2) above (the proportion of monosulfonated derivative used was 99 wt % or greater as a proportion by weight)

Compound B: a compound for which $R^1$=$CH_3$, $R^2$=$CH_3$, $R^3$=$C_{18}H_{37}$, $R_4$=$C_{18}H_{37}$, and m+n=1 in Formula (1) and Formula (2) above (the proportion of monosulfonated derivative used was 99 wt % or greater as a proportion by weight)

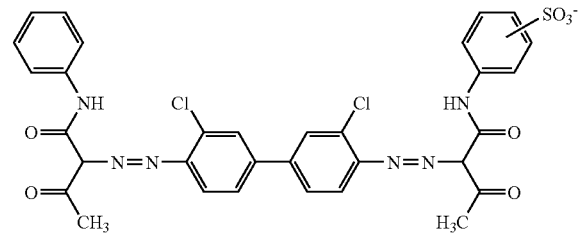

(A)

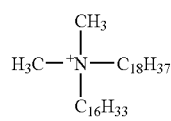

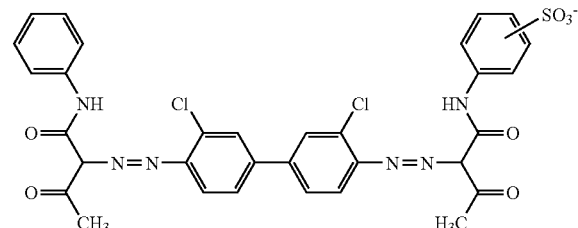

(B)

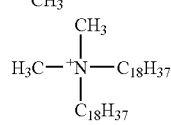

The Evaluation Results of Dispersibility of Yellow Pigment Dispersions

Dispersibility of yellow pigment dispersions prepared was evaluated in accordance with the evaluation described below. The results are shown in Table 2.

Flowability After Pre-Dispersion

The flowability of a liquid after pre-dispersion was evaluated in accordance with the procedure below.

About 50 cc of pre-dispersed liquid mixture was transferred to a new 200 cc plastic disposable beaker. Subsequently, flowability was evaluated by whether or not the mixture flowed out by allowing the disposable beaker to stand for 15 sec so that its opening was tilted obliquely downward 30 degrees from the horizontal direction. The liquid temperature was 25° C. The evaluation criteria were as shown below; evaluations of Good and Acceptable were criteria that satisfied performance requirements.

Good: at least 90% of the mixture flowed out, and the amount remaining in the disposable beaker was less than 10%.

Acceptable: at least 70% of the mixture flowed out, and the amount remaining in the disposable beaker was less than 30%.

Poor: the majority of the mixture remained in the disposable beaker and the amount thereof was at least 30%.

Flowability After Main Dispersion

The flowability of a liquid after main dispersion was evaluated in accordance with the procedure below.

About 50 cc of pigment dispersion after main dispersion was transferred to a new 200 cc plastic disposable beaker. Subsequently, flowability was evaluated by whether or not the dispersion flowed out by allowing the disposable beaker to stand for 15 sec so that its opening was tilted obliquely downward 30 degrees from the horizontal direction. The liquid temperature was 25° C. The evaluation criteria were as shown below; evaluations of Good and Acceptable were criteria that satisfied performance requirements.

Good: at least 90% of the mixture flowed out, and the amount remaining in the disposable beaker was less than 10%.

Acceptable: at least 70% of the mixture flowed out, and the amount remaining in the disposable beaker was less than 30%.

Poor: the majority of the mixture remained in the disposable beaker and the amount thereof was at least 30%.

Particle Size Distribution of Pigment Dispersion

Particle size distribution was measured using a commercial particle size profiler (laser diffractometry: LA-920 (manufactured by Horiba Ltd.)). The evaluation criteria were as shown below; evaluations of Excellent, Good, and Acceptable were criteria that satisfied performance requirements.

Excellent: distribution of 1 μm and above was not detected, and average particle size was less than 100 nm.

Good: distribution of 1 μm and above was not detected, and average particle size was at least 100 nm but less than 300 nm.

Acceptable: distribution of 1 μm and above was not detected, and average particle size was at least 300 nm but no greater than 600 nm.

Poor: distribution of 1 μm and above was detected, or average particle size exceeded 600 nm.

TABLE 2

| Yellow Pigment Dispersion | Flowability after Pre-dispersion | Flowability after Main Dispersion | Particle Size Distribution |
| --- | --- | --- | --- |
| A | Good | Good | Excellent |
| B | Good | Good | Good |

TABLE 2-continued

| Yellow Pigment Dispersion | Flowability after Pre-dispersion | Flowability after Main Dispersion | Particle Size Distribution |
|---|---|---|---|
| C | Good | Good | Good |
| D | Poor | — | — |
| E | Good | Poor | — |
| F | Good | Good | Good |
| G | Good | Good | Good |
| H | Good | Good | acceptable |
| I | Good | acceptable | Good |

Preparation of Other Pigment Dispersions

Pigment dispersions except yellow were prepared via a pre-dispersion step and a main dispersion step.

Pre-dispersion step: The components shown in Table 3 were mixed, and stirred using a stirrer for 1 hour.

Main dispersion step: After stirring, the mixture was dispersed by means of bead mill dispersion, thus giving a pigment dispersion. Dispersion was carried out under conditions of 0.65 mm diameter zirconia beads packed at a packing ratio of 70%, a peripheral speed of 9 m/s, and a dispersion time of 2 to 8 hours.

TABLE 3

| Composition (parts by weight) | Cyan Pigment Dispersion A | Magenta Pigment Dispersion A | Black Pigment Dispersion A | White Pigment Dispersion A |
|---|---|---|---|---|
| Cyan Pigment A | 30.0 | — | — | — |
| Magenta Pigment A | — | 30.0 | — | — |
| Black Pigment A | — | — | 40.0 | — |
| White Pigment A | — | — | — | 60.0 |
| Polymerizable Compound B | 50.0 | 50.0 | 35.0 | 35.0 |
| Commercial Dispersant 1 | 20.0 | 20.0 | 25.0 | — |
| Commercial Dispersant 5 | — | — | — | 5.0 |

(Materials Used for Preparing Other Pigment Dispersions)

Cyan Pigment A: PB 15:3 (IRGALITE BLUE GLO; manufactured by Ciba Specialty Chemicals)

Magenta Pigment A: PV 19 (CINQUASIA MAGENTA RT-355D; manufactured by Ciba Specialty Chemicals)

Black Pigment A: Carbon black (SPECIAL BLACK 250; manufactured by Degussa GmbH)

White Pigment A: CR 60-2 (Titanium oxide; manufactured by Ishihara Sangyo Kaisha Ltd.)

Polymerizable Compound B: PEA (phenoxyethyl acrylate; manufactured by Dai-ichi Kogyo Seiyaku Co., Ltd.)

Commercial Dispersant 1: BYK-168 (manufactured by BYK-Chemie GmbH)

Commercial Dispersant 5: Solsperse 36000 (manufactured by Lubrizol Corp.)

Preparation of Ink Composition

Components shown in Tables 4 to 10 (units: parts by weight) were stirred, mixed, and dissolved to give ink compositions. When these ink compositions were subjected to measurement at a liquid temperature of 25° C. by the Wilhelmy method using a surface tensiometer (e.g. a CBVP-Z surface tensiometer manufactured by Kyowa Interface Science Co., Ltd.), values measured for the surface tension of the ink compositions were all in the range of 25 to 26 mN/m.

TABLE 4

| Composition (parts by weight) | Yellow Ink Composition | | |
|---|---|---|---|
| | A | B | C |
| Yellow Pigment Dispersion A | 20.0 | 15.6 | 12.0 |
| Polymerizable Compound B | 35.0 | 35.0 | 35.0 |
| Polymerizable Compound C | 30.8 | 34.8 | 38.8 |
| Polymerizable Compound D | 1.0 | 1.0 | 1.0 |
| Surfactant A | 0.1 | 0.1 | 0.1 |
| Polymerization Inhibitor A | 0.1 | 0.5 | 0.1 |
| Initiator A | 6.0 | 6.0 | 6.0 |
| Initiator B | 2.0 | 2.0 | 2.0 |
| Initiator C | 2.0 | 2.0 | 2.0 |
| Sensitizer A | 3.0 | 3.0 | 3.0 |

TABLE 5

| Composition (parts by weight) | Yellow Ink Composition | | |
|---|---|---|---|
| | D | E | F |
| Yellow Pigment Dispersion B | 20.0 | 15.6 | 12.0 |
| Polymerizable Compound B | 35.0 | 35.0 | 35.0 |
| Polymerizable Compound C | 30.8 | 34.8 | 38.8 |
| Polymerizable Compound D | 1.0 | 1.0 | 1.0 |
| Surfactant A | 0.1 | 0.1 | 0.1 |
| Polymerization Inhibitor A | 0.1 | 0.5 | 0.1 |
| Initiator A | 6.0 | 6.0 | 6.0 |
| Initiator B | 2.0 | 2.0 | 2.0 |
| Initiator C | 2.0 | 2.0 | 2.0 |
| Sensitizer A | 3.0 | 3.0 | 3.0 |

TABLE 6

| Composition (parts by weight) | Yellow Ink Composition | | |
|---|---|---|---|
| | G | H | I |
| Yellow Pigment Dispersion C | 20.0 | 15.6 | 12.0 |
| Polymerizable Compound B | 35.0 | 35.0 | 35.0 |
| Polymerizable Compound C | 30.8 | 34.8 | 38.8 |
| Polymerizable Compound D | 1.0 | 1.0 | 1.0 |
| Surfactant A | 0.1 | 0.1 | 0.1 |
| Polymerization Inhibitor A | 0.1 | 0.5 | 0.1 |
| Initiator A | 6.0 | 6.0 | 6.0 |
| Initiator B | 2.0 | 2.0 | 2.0 |
| Initiator C | 2.0 | 2.0 | 2.0 |
| Sensitizer A | 3.0 | 3.0 | 3.0 |

TABLE 7

| Composition | Yellow Ink Composition | | |
|---|---|---|---|
| (parts by weight) | J | K | L |
| Yellow Pigment Dispersion F | 20.0 | 15.6 | 12.0 |
| Polymerizable Compound B | 35.0 | 35.0 | 35.0 |
| Polymerizable Compound C | 30.8 | 34.8 | 38.8 |
| Polymerizable Compound D | 1.0 | 1.0 | 1.0 |
| Surfactant A | 0.1 | 0.1 | 0.1 |
| Polymerization Inhibitor A | 0.1 | 0.5 | 0.1 |
| Initiator A | 6.0 | 6.0 | 6.0 |
| Initiator B | 2.0 | 2.0 | 2.0 |
| Initiator C | 2.0 | 2.0 | 2.0 |
| Sensitizer A | 3.0 | 3.0 | 3.0 |

TABLE 8

| Composition | Yellow Ink Composition | | |
|---|---|---|---|
| (parts by weight) | M | N | O |
| Yellow Pigment Dispersion G | 20.0 | 15.6 | 12.0 |
| Polymerizable Compound B | 35.0 | 35.0 | 35.0 |
| Polymerizable Compound C | 30.8 | 34.8 | 38.8 |
| Polymerizable Compound D | 1.0 | 1.0 | 1.0 |
| Surfactant A | 0.1 | 0.1 | 0.1 |
| Polymerization Inhibitor A | 0.1 | 0.5 | 0.1 |
| Initiator A | 6.0 | 6.0 | 6.0 |
| Initiator B | 2.0 | 2.0 | 2.0 |
| Initiator C | 2.0 | 2.0 | 2.0 |
| Sensitizer A | 3.0 | 3.0 | 3.0 |

TABLE 9

| Composition | Yellow Ink Composition | | |
|---|---|---|---|
| (parts by weight) | P | Q | R |
| Yellow Pigment Dispersion A | 20 | 20 | 20 |
| Polymerizable Compound B | 35.0 | 35.0 | 35.0 |
| Polymerizable Compound C | 34.8 | 30.8 | 30.8 |
| Polymerizable Compound D | 1.0 | 1.0 | 1.0 |
| Surfactant A | 0.1 | 0.1 | 0.1 |
| Polymerization Inhibitor A | 0.1 | 0.1 | 0.1 |
| Initiator A | 6.0 | 6.0 | 6.0 |
| Initiator B | — | 4.0 | — |
| Initiator C | — | — | 4.0 |
| Sensitizer A | 3.0 | 3.0 | 3.0 |

TABLE 10

| Composition (parts by weight) | Magenta Ink Composition A | Cyan Ink Composition A | White Ink Composition A | Black Ink Composition A |
|---|---|---|---|---|
| Magenta Pigment Dispersion A | 19.5 | — | — | — |
| Cyan Pigment Dispersion A | — | 7.2 | — | — |
| White Pigment Dispersion A | — | — | 10.0 | — |
| Black Pigment Dispersion A | — | — | — | 10.0 |
| Polymerizable Compound A | 30.4 | 36.3 | 35.1 | 35.1 |
| Polymerizable Compound B | 30.4 | 36.3 | 35.1 | 35.1 |
| Polymerizable Compound C | 1.0 | 1.0 | 1.0 | 1.0 |
| Surfactant A | 0.1 | 0.1 | 0.1 | 0.1 |
| Polymerization Inhibitor A | 0.1 | 0.5 | 0.1 | 0.1 |
| Initiator A | 6.0 | 6.0 | 6.0 | 6.0 |
| Initiator B | 2.0 | 2.0 | 2.0 | 2.0 |
| Initiator C | 2.0 | 2.0 | 2.0 | 2.0 |
| Sensitizer A | 8.6 | 8.6 | 8.6 | 8.6 |

(Materials Used for Preparing the Ink Compositions)

Polymerizable Compound B: PEA (phenoxyethyl acrylate; manufactured by Dai-ichi Kogyo Seiyaku Co., Ltd.)

Polymerizable compound C: DPGDA (dipropylene glycol diacrylate; manufactured by Daicel-Cytec Company Ltd.)

Polymerizable compound D: A-TMPT (trimethylolpropane triacrylate; manufactured by Shin-Nakamura Chemical Co., Ltd.)

Surfactant A: BYK-307 (manufactured by BYK-Chemie, surfactant)

Polymerization Inhibitor A: FIRSTCURE ST-1 (manufactured by Albemarle)

Initiator A: 2,4,6-trimethylbenzoyldiphenylphosphine oxide (acylphosphine oxide)

Initiator B: bis(2,4,6-trimethylbenzoyl)phenylphosphine oxide (acylphosphine oxide)

Initiator C: 2-methyl-1-(4-methylthiophenyl)-2-morpholino-propan-1-one

Initiator D: 1-hydroxycyclohexyl phenyl ketone

Initiator E: 1-[4-(2-hydroxyethoxy)phenyl]-2-hydroxy-2-methyl-1-propan-1-one

Sensitizer A: Speedcure ITX (a mixture of 2-isopropylthioxanthone and 4-isopropylthioxanthone; manufactured by Lambson Ltd.)

Image Recording System

A schematic diagram of an inkjet recording printer used in printing is shown in FIG. 1.

An inkjet recording head unit part was formed from eight groups of head sets, of which two commercial heads (CA4 head, manufactured by Toshiba Tec Corporation) per color were arranged to give 600 npi, and two commercial UV-curing lamps (metal halide lamps). The inkjet recording head unit part was fixed by a long metal shaft, and was reciprocated at a variable speed by means of a power part that could carry out reciprocation. The power part that could carry out reciprocation was equipped with a tube for supplying an ink composition and electric wiring for controlling the head.

Opposite ends of the fixing shaft for the inkjet recording head unit part were equipped with a BOX for carrying out maintenance and cleaning of the head. Furthermore, disposed outside them were a PC for controlling the inkjet recording printer and an ink tank.

A recording medium suction stage that could fix a recording medium by suction was disposed immediately beneath the head. The recording medium was transported in a direction perpendicular to the reciprocating direction of the head by means of a plurality of recording medium transport rollers and a recording medium wind-up roller.

The discharge frequency of the head and the speed for reciprocation of the head were controlled so that an image was always printed at a fired droplet density of 600×600 dpi. The illumination intensity from the metal halide lamp was fixed at about 1,000 mW/cm² on the recording medium. The speed of reciprocation and an aperture width of a slit within the metal halide lamp were adjusted so that the illumination intensity could be varied between five levels (300 mJ/cm², 600 mJ/cm², 900 mJ/cm², 1,200 mJ/cm², 1,500 mJ/cm²).

The recording medium employed a white PVC pressure-sensitive adhesive sheet and a transparent PET pressure-sensitive adhesive sheet. When printing was carried out on a white PVC pressure-sensitive adhesive sheet, a white ink composition was not used. When printing was carried out on a transparent PET pressure-sensitive adhesive sheet, a white ink composition was used for a base, and an image was formed using other colors.

Examples 1 to 9 and Comparative Examples 1 to 9

In Example 1, the image recording system was charged with yellow ink composition A, cyan ink composition A, magenta ink composition A, white ink composition A, and black ink composition A, printed materials were obtained, and inkjet suitability (dischargeability) of the yellow ink composition and saturation of a yellow image were evaluated. Furthermore, long-term stability of the yellow ink composition was evaluated at constant temperature and constant humidity.

The evaluation procedure and evaluation criteria for inkjet suitability (dischargeability), saturation of yellow image, and long-term stability of the ink composition were as shown below.

In Examples 2 to 9 and Comparative Examples 1 to 9, evaluation was carried out in the same manner as in Example 1 except that yellow ink composition A was replaced by an ink composition shown in Table 11.

Evaluation results for Examples 1 to 9 and Comparative Examples 1 to 9 are as shown in Table 11.

Inkjet Suitability (Dischargeability)

Printing was carried out continuously for 30 min using the image recording system at a discharge frequency of 6.2 kHz and a fired droplet density of 600×600 dpi, and inkjet suitability (dischargeability) was evaluated by the presence or absence of misfiring. The drive voltage was set so that the droplet size per pixel was about 42 picoliter (7 drop setting).

Evaluation criteria for inkjet suitability (dischargeability) were as shown below; evaluations of Excellent and Good were in the required performance range.

Excellent: there were no nozzles for which misfiring occurred.
Good: there were 1 to 2 nozzles for which misfiring occurred.
Poor: there were 3 or more nozzles for which misfiring occurred.

Saturation

A yellow solid image was printed using the image recording system at a fired droplet density of 600×600 dpi, and evaluation of saturation was carried out by measuring the hue (a*, b*) of a sample. The drive voltage was set so that the droplet size per pixel was about 14 picoliter (2 drop setting). The hue was measured using a commercial colorimeter (SPM100-II, Gretag).

Evaluation criteria for saturation were as shown below; evaluations of Excellent and Good were in the required performance range.

Excellent: b*>103
Good: 103≧b*>100.
Poor: 100>b*.

Long-Term Stability of Ink Composition

A screw-cap glass bottle (100 cc) was charged with 50 cc of an ink composition and capped tightly, and stored in a constant temperature and constant humidity chamber set at a temperature of 60° C. and a humidity of 45% RH for 30 days, and the long-term stability of the ink composition was evaluated by changes in viscosity and average particle size.

Evaluation criteria for the long-term stability of an ink composition were as shown below; evaluations of Excellent and Good were in the required performance range.

Excellent: changes in both viscosity and average particle size were less than 10%.
Good: change in viscosity was less than 10%, and change in average particle size was less than 50%.
Poor: change in viscosity was 10% or greater or change in average particle size was 50% or greater.

TABLE 11

|  | Evaluated Yellow Ink Composition | InkJet Suitability (Dischargeability) | Long-term Stability of Ink Composition | Saturation |
|---|---|---|---|---|
| Ex. 1 | A | Good | Good | Excellent |
| Ex. 2 | B | Excellent | Good | Good |
| Ex. 3 | C | Excellent | Excellent | Good |
| Ex. 4 | D | Good | Good | Excellent |
| Ex. 5 | E | Excellent | Good | Good |
| Ex. 6 | F | Excellent | Excellent | Good |
| Comp. Ex. 1 | G | Poor | Poor | Good |
| Comp. Ex. 2 | H | Poor | Good | Good |
| Comp. Ex. 3 | I | Good | Good | Poor |
| Comp. Ex. 4 | J | Poor | Poor | Poor |
| Comp. Ex. 5 | K | Poor | Good | Poor |
| Comp. Ex. 6 | L | Good | Good | Poor |
| Comp. Ex. 7 | M | Poor | Poor | Poor |
| Comp. Ex. 8 | N | Poor | Good | Poor |
| Comp. Ex. 9 | O | Good | Good | Poor |
| Ex. 7 | P | Good | Good | Excellent |
| Ex. 8 | Q | Good | Good | Excellent |
| Ex. 9 | R | Good | Good | Excellent |

Examples 10 to 13

Evaluation of curability was carried out by the curability test below using ink compositions A, P, Q, and R. Evaluation results are given in Table 12.

Curability Test

Curability is defined as the exposure energy at which there is no tackiness on the printed surface and there is no film peeled by scratching with a fingernail.

The presence or absence of tackiness of a printed surface was determined by pressing plain paper (Photocopy paper C2, manufactured by Fuji Xerox Co., Ltd.) thereagainst immediately after printing; when the ink composition transferred tackiness was present, and when there was no transfer tackiness was absent.

Whether or not film was peeled by scratching with a fingernail after printing was determined by scratching an ink cured film with a fingernail with a fixed load immediately after printing; when the film was peeled, there was peeling by fingernail, and when no film peeled, there was no peeling by fingernail.

Exposure energy was varied between 300 mJ/cm², 600 mJ/cm², 900 mJ/cm², 1,200 mJ/cm², and 1,500 mJ/cm², and evaluation was carried out in accordance with the criteria below.

5: no tackiness with exposure at 300 mJ/cm².
4: no tackiness with exposure at 600 mJ/cm².
3: no tackiness with exposure at 900 mJ/cm².
2: no tackiness with exposure at 1,200 mJ/cm².
1: no tackiness with exposure at 1,500 mJ/cm².

The test results for curability are given in Table 12. The lower the tack-free sensitivity, the more preferable from the viewpoint of curability, and it is particularly preferable for it to be 900 mJ/cm² or below (5 to 3).

TABLE 12

|  | Evaluated Yellow Ink Composition | Resuls of Curability Test |
| --- | --- | --- |
| Ex. 10 | Ink Composition A | 5 |
| Ex. 11 | Ink Composition P | 3 |
| Ex. 12 | Ink Composition Q | 3 |
| Ex. 13 | Ink Composition R | 4 |

The invention claimed is:

1. An ink composition comprising:
(A) an isoindoline-based pigment;
(B) a polymeric dispersant;
(C) an alkylammonium salt of a sulfonated derivative of a disazo-based yellow colorant, which has a content of 3 to 100 wt % relative to the total weight of the isoindoline-based pigment (A) in the ink composition;
(D) a polymerizable compound; and
(E) a polymerization initiator.

2. The ink composition according to claim 1, wherein the isoindoline-based pigment (A) is C.I. Pigment Yellow 185.

3. The ink composition according to claim 1, wherein the alkylammonium salt of the sulfonated derivative of the disazo-based yellow colorant (C) is a sulfonated derivative of a disazo-based yellow colorant selected from the group consisting of C.I. Pigment Yellow 12, C.I. Pigment Yellow 14, C.I. Pigment Yellow 17, C.I. Pigment Yellow 81, and C.I. Pigment Yellow 83.

4. The ink composition according to claim 1, wherein the alkylammonium salt of the sulfonated derivative of the disazo-based yellow colorant (C) is a compound having a sulfonate group on an aromatic ring.

5. The ink composition according to claim 1, wherein the alkylammonium salt of the sulfonated derivative of the disazo-based yellow colorant (C) comprises a monoalkylammonium salt of a monosulfonated derivative of a disazo-based yellow colorant.

6. The ink composition according to claim 1, wherein the alkylammonium salt of the sulfonated derivative of the disazo-based yellow colorant (C) is a compound represented by Formula (1) below,

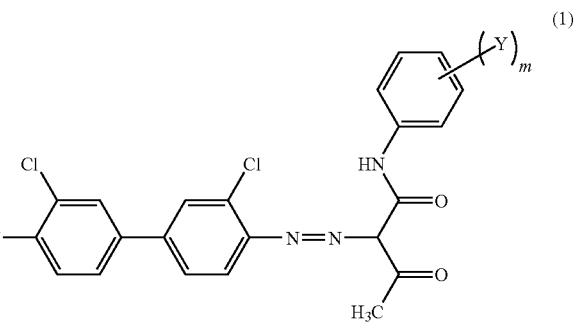

(in Formula (1), X and Y independently denote a group represented by Formula (2) below, and m and n each denote a number that satisfies $0.2 < m+n \leq 1.5$ and is 0 or more)

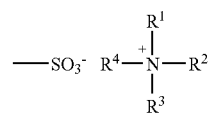

(in Formula (2), $R^1$ to $R^4$ independently denote a hydrogen atom or an alkyl group having 1 to 30 carbon atoms, and at least one of $R^1$ to $R^4$ is an alkyl group having 1 to 30 carbon atoms).

7. The ink composition according to claim 1, wherein the polymerizable compound (D) is a radically polymerizable compound.

8. The ink composition according to claim 1, wherein the polymerization initiator (E) comprises an acylphosphine oxide compound.

9. The ink composition according to claim 1, wherein the polymerization initiator (E) comprises an acylphosphine oxide compound and an α-aminobenzophenone compound.

10. The ink composition according to claim 1, wherein the polymerization initiator (E) comprises an α-hydroxybenzophenone compound and an α-aminobenzophenone compound.

11. A pigment dispersion comprising:
(A) an isoindoline-based pigment;
(B) a polymeric dispersant; and
(C) an alkylammonium salt of a sulfonated derivative of a disazo-based yellow colorant, which has a content of 0.1 to 10 wt % relative to the total weight of the isoindoline-based pigment (A) in the pigment dispersion.

12. An inkjet recording method comprising:
($a^1$) a step of discharging an ink composition onto a recording medium; and
($b^1$) a step of curing the ink composition by irradiating the discharged ink composition with actinic radiation;

the ink composition being the ink composition according to claim 1.

13. The inkjet recording method according to claim 12, wherein the recording medium is a non-absorbing recording medium.

\* \* \* \* \*